US010917557B2

(12) United States Patent
Stanard et al.

(10) Patent No.: US 10,917,557 B2
(45) Date of Patent: Feb. 9, 2021

(54) HUMAN-AUTOMATION COLLABORATIVE TRACKER OF FUSED OBJECT

(71) Applicant: Government of the United States, as represented by the Secretary of the Air Force, Wright-Patterson AFB, OH (US)

(72) Inventors: Terry W. Stanard, Dayton, OH (US); Theus H. Aspiras, Huber Heights, OH (US); Vijayan K. Asari, Dayton, OH (US); Taleri L. Hammack, Fairborn, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 16/373,681

(22) Filed: Apr. 3, 2019

(65) Prior Publication Data

US 2020/0029013 A1      Jan. 23, 2020

Related U.S. Application Data

(60) Provisional application No. 62/658,121, filed on Apr. 16, 2018, provisional application No. 62/820,465, filed on Mar. 19, 2019.

(51) Int. Cl.
*H04N 5/232* (2006.01)
*G06T 7/246* (2017.01)
*H04N 5/28* (2006.01)

(52) U.S. Cl.
CPC ......... *H04N 5/23216* (2013.01); *G06T 7/246* (2017.01); *H04N 5/23218* (2018.08);
(Continued)

(58) Field of Classification Search
CPC .. H04N 5/23216; H04N 5/23218; H04N 5/28; G06T 7/246; G06T 2207/10016; G06T 2207/30232; G06T 2207/30241
See application file for complete search history.

(56) References Cited

U.S. PATENT DOCUMENTS

| 2006/0077255 A1* | 4/2006 | Cheng ................ H04N 5/2224 348/143 |
| 2011/0019027 A1* | 1/2011 | Fujita ................ H04N 5/23218 348/222.1 |

(Continued)

OTHER PUBLICATIONS

Chen et al. (Situation awareness-based agent transparency. No. ARL-TR-6905. Army research lab aberdeen proving ground md human research and engineering directorate, 2014.) (Year: 2014).*

(Continued)

*Primary Examiner* — Maria E Vazquez Colon
(74) *Attorney, Agent, or Firm* — AFMCLO/JAZ; David E. Franklin

(57) ABSTRACT

A system includes a control station that enables efficient human collaboration with automated object tracking. The control station is communicatively coupled to an aerial vehicle to receive full motion video of a ground scene taken by an airborne sensor of the aerial vehicle. The control station spatially registers features of a movable object present in the ground scene and determines motion of the movable object relative to the ground scene. The control station predicts a trajectory of the movable objective relative to the ground scene. The control station tracks the movable object based on data fusion of: (i) the spatially registered features; (ii) the determined motion; and (iii) the predicted trajectory of the movable object. The control station presents a tracking annotation and a determined confidence indicator for the tracking annotation on a user interface device to facilitate human collaboration with object tracking.

22 Claims, 11 Drawing Sheets

(52) U.S. Cl.
CPC ..... *H04N 5/28* (2013.01); *G06T 2207/10016* (2013.01); *G06T 2207/30232* (2013.01); *G06T 2207/30241* (2013.01)

(56) References Cited

U.S. PATENT DOCUMENTS

| | | | | |
|---|---|---|---|---|
| 2015/0055855 | A1* | 2/2015 | Rodriguez | G06K 9/6259 382/159 |
| 2017/0236284 | A1* | 8/2017 | Elliethy | G06T 7/33 382/294 |
| 2020/0059595 | A1* | 2/2020 | Ono | H04N 5/23219 |

OTHER PUBLICATIONS

McGuirl et al. (Supporting Trust Calibration and the Effective Use of Decision Aids by Presenting Dynamic System Confidence Information. Human Factors. 2006;48(4):656-665. doi:10.1518/001872006779166334) (Year: 2006).*

T. H. Aspiras, V. K. Asari, and J. Vasquez, "Gaussian ringlet intensity distribution (grid) features for rotation-invariant object detection in wide area motion imagery," in Image Processing (ICIP), 2014 IEEE International Conference on. IEEE, 2014, pp. 2309-2313.

Chen, J. Y. C., Procci, M., Boyce, J., Wright, A., Garcia, & Barnes, M. (2014). Situation Awareness-Based Agent Transparency. Technical Report ARL-TR-6905, Aberdeen Proving Ground, MD.

Kevin Jackovitz and Vijayan K. Asari, "Registration of region of interest for object tracking applications in wide area motion imagery," Proceedings of the IEEE Computer Society Workshop on Applied Imagery and Pattern Recognition—Apr. 2012, pp. 1-8, Washington, DC, Oct. 9-11, 2012. (IEEE).

E. Krieger, P. Sidike, T. Aspiras, and V. K. Asari, "Directional ringlet intensity feature transform for tracking," in Image Processing (ICIP), 2015 IEEE International Conference on. IEEE, 2015, pp. 3871-3875.

Lyons, J. B. (2013). Being transparent about transparency: A model for human-robot interaction. In D. Sofge, D., G. J. Kruijff, G. J., & W. F. Lawless (eds.), Trust and Automation Systems: Papers from the AAAI spring symposium. Technical Report SS-13-07), AAAI Press, Menlo Park, CA.

Lyons, J.B., Koltai, K.S., Ho, N.T., Johnson, W.B., Smith, D.E., & Shively, J.R. (2016). Engineering Trust in Complex Automated Systems. Ergonomics in Design, 24, 13-17.

Alex Mathew and Vijayan K. Asari, "Local histogram based descriptor for object tracking in wide area motion imagery," International Journal of Information Processing, vol. 6, No. 4, pp. 1-12, 2012. (IJIP).

Alex Mathew and Vijayan K. Asari, "Tracking small targets in wide area motion imagery data," Proceedings of IS&T/ SPIE International Conference on Electronic Imaging: Video Surveillance and Transportation Imaging Applications, San Francisco, CA, USA, vol. 8402, pp. 840205:1-9, Feb. 3-7, 2013. (IS&T/SPIE).

McGuirl, J. M., & Sarter, N. B. (2006). Supporting trust calibration and the effective use of decision aids by presenting dynamic system confidence information. Human Factors, 48 (4), 656-665.

Mercado, J. E., M. A. Rupp, J. Y. C. Chen, M. J. Barnes, D. Barber, and K. Procci. (2016). Intelligent Agent Transparency in Human-Agent Teaming for Multi-UxV Management. Human Factors, 58(3), 401-415.

Jones, W., & Graley, J. (2012). AFRL Support for AFSOC PED Analyst Needs: Available and Emerging Technology Programs to Improve Mission Outcomes. Technical Report AFRL-RH-WP-TR-2012-0020, Wright Patterson AFB, Ohio.

McCloskey, M., Behymer, K., O'Connor, M., & Kuperman, G. (2012). A Cognitive Study of the Analysis Task Performance within the 181st Intelligence Wing. Technical Report AFRL-RH-WP-TR-2012-0166, Wright Patterson AFB, Ohio.

McCloskey, M. J., O'Connor, M. P., Stansifer, C. M., Harrison, T. P., Gorham, B. D., Seibert, B. A., Horvath, G. P., Zelik & Ocampo, S. M. (2015). Innovative Contested, Degraded, Operationally-limited (CDO) Environment Analysis Characteristics, Challenges, and Support Concepts Across the Air Force Distributed Common Ground System (DCGS) Enterprise. Technical Report FRL-RH-WP-TR-2015-0025, Wright Patterson AFB, Ohio.

Behymer, K., Kancler, D., Stansifer, C., Cone, S., & McCloskey, M. (2013). A Cognitive Work Analysis and Visit to the 497th Intelligence, Surveillance and Reconnaissance Group—Langley AFB, VA. Technical Report AFRL-RH-WP-TR-2013-0121, Wright Patterson AFB, Ohio.

Turner, K., Stansifer, C., Stanard, T., Harrison, T., & Lauback, D. (2013). A Cognitive Analysis of the 27th Special Operations Group—Cannon AFB, NM. Technical Report AFRL-RH-WP-TR-2013-0144, Wright Patterson AFB, Ohio.

Santhaseelan, V., and Asari, V. K. (2014) "Moving object detection and tracking in wide area motion imagery," Wide Area Surveillance: Real Time Motion Detection Systems, Edited by Vijayan K. Asari, Chapter 3, Springer Book Series: Augmented Vision and Reality, Series Editors: Riad I. Hammoud and Lawrence B. Wolff, Springer, DOI: 10.1007/8612_2012_9, vol. 6, pp. 49-70, 2014.

Smeulders, A. W. M., Chu, D. M., Cucchiaru, R., Calderara, S., Dehghan, A., & Shah, M. (2014). Visual tracking: An experimental survey. IEEE Transactions on Pattern Analysis and Machine Intelligence, 36(7), 1442-1468.

* cited by examiner

HUMAN-AUTOMATION COLLABORATIVE TRACKER OF FUSED OBJECT

CROSS-REFERENCE TO RELATED APPLICATIONS

This application claims the benefit of priority under 35 U.S.C. § 119(e) to: (i) U.S. Provisional Application Ser. No. 62/658,121 entitled "A Fused Object Tracking Algorithm," filed 16 Apr. 2018; and (ii) U.S. Provisional Application Ser. No. 62/820,465 entitled "Human-Automation Collaborative Tracker of Fused Object", filed 19 Mar. 2019, the contents of both of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to testing apparatus and methods of presenting and tracking moving objects within visual or infrared imagery.

2. Description of the Related Art

A common Remotely Piloted Aircraft (RPA) Intelligence, Surveillance, and Reconnaissance (ISR) mission is to collect Full Motion Video (FMV) of areas and persons of interest to develop patterns of life where terrorist and insurgent groups operate. These missions can also transition to time sensitive strikes of ground targets. One of the most frequent, important, and difficult components of pattern of life and strike missions is tracking the location and activities of a vehicle (e.g., often a passenger car, pickup, motorcycle). Vehicles move quickly and can be confused with other vehicles nearby. They may also disappear behind a building or tree line and be difficult to reacquire once they reemerge in the FMV. The limited field of view of FMV sensors also contributes to the challenge of keeping up with a vehicle. Losing a vehicle of high importance is such great concern that in one RPA Operations Center a prominent sign was seen on the wall which displayed the number of days since the last time a vehicle was lost during a mission.

BRIEF SUMMARY

In one aspect, the present disclosure provides a method of enabling efficient human collaboration with automated object tracking. In one or more embodiments, the method includes receiving full motion video of a ground scene taken by an airborne sensor. The method includes spatially registering features of a movable object present in the ground scene. The method includes determining motion of the movable object relative to the ground scene. The method includes predicting a trajectory of the movable objective relative to the ground scene. The method includes tracking the movable object based on data fusion of: (i) the spatially registered features; (ii) the determined motion; and (iii) the predicted trajectory of the movable object. The method includes presenting a tracking annotation on a user interface device. The method includes determining a confidence value of the tracking of the movable object. The method includes presenting a confidence indicator on the user interface device to facilitate human collaboration with object tracking.

In another aspect, the present disclosure provides a system that enables efficient human collaboration with automated object tracking. In one or more embodiments, the system includes an aerial vehicle having an airborne sensor. The system includes a control station communicatively coupled to the aerial vehicle to: (a) receive full motion video of a ground scene taken by the airborne sensor; (b) spatially register features of a movable object present in the ground scene; (c) determine motion of the movable object relative to the ground scene; (d) predict a trajectory of the movable objective relative to the ground scene; (e) track the movable object based on data fusion of: (i) the spatially registered features; (ii) the determined motion; and (iii) the predicted trajectory of the movable object; (f) present a tracking annotation on a user interface device; (g) determine a confidence value of the tracking of the movable object; and (h) present a confidence indicator on the user interface device to facilitate human collaboration with object tracking.

In an additional aspect, the present disclosure provides a control station that enables efficient human collaboration with automated object tracking. In one or more embodiments, the control station includes a network interface communicatively coupled to an aerial vehicle having an airborne sensor. The control station includes a controller communicatively coupled to the network interface. The control station enables the control station to: (a) receive full motion video of a ground scene taken by the airborne sensor; (b) spatially register features of a movable object present in the ground scene; (c) determine motion of the movable object relative to the ground scene; (d) predict a trajectory of the movable objective relative to the ground scene; (e) track the movable object based on data fusion of: (i) the spatially registered features; (ii) the determined motion; and (iii) the predicted trajectory of the movable object; (f) present a tracking annotation on a user interface device; (g) determine a confidence value of the tracking of the movable object; and (h) present a confidence indicator on the user interface device to facilitate human collaboration with object tracking.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to aspects of the present innovation, a fused object tracking method, system and computer program product facilitates human-automation collaborative tracking by communicating confidence and tracking faults through a user interface.

Figure 1:
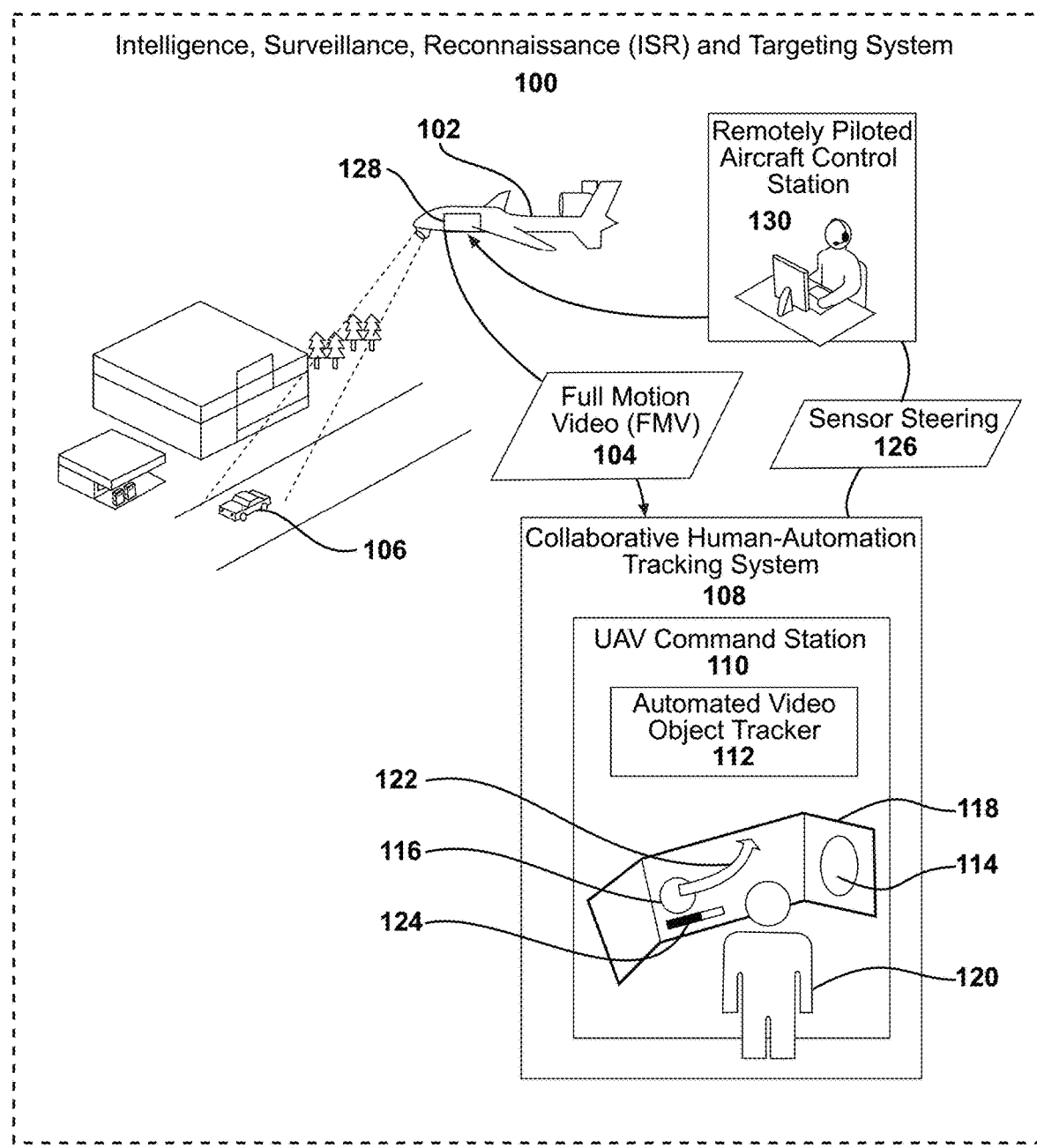
FIG. 1 is a diagram of an intelligence, surveillance, and reconnaissance (ISR) and targeting system, according to one or more embodiments.

FIG. 1 is a diagram of an intelligence, surveillance, and reconnaissance (ISR) and targeting system 100. The system 100 includes one or more unmanned aerial vehicles (UAVs) 102 that provide full motion video (FMV) 104 of a movable ground target 106 to a collaborative human-automation tracking system 108 that includes a UAV command station 110. An automated video object tracker ("tracker") 112 enhances and improves the UAV command station 110 by providing humanly-perceptible indicators 114 and control affordances 116 on one or more user interface devices 118 to a human operator 120. The indicators 116 enhance situational awareness of the human operator 120 by indicating historical path 122 of the movable ground target 106 and a confidence level indication 124 in the automated tracking. An operator can visually extrapolate the historical path 122 to determine an expected path. In one or more embodiments, when in automated control, the tracker 112 communicates a sensor steering command 126 directly to an autonomous controller 128 of a UAV 102 that provides the FMV 104 or a remotely piloted aircraft (RPA) control station 130. In one or more embodiments, when in automated control, the tracker 112 communicates the sensor steering command 126 indirectly to an autonomous controller 128 of a UAV 102 that provides the FMV 104 or a remotely piloted aircraft (RPA) control station 130.

Optical object tracking algorithms have been deeply researched for full motion video (FMV) and wide area motion imagery (WAMI). Optical object tracking algorithms are designed to follow pedestrians and vehicles of interest as viewed by these sensors. Object trackers are selectively used by the US government to perform intelligence, surveillance, and reconnaissance (ISR) and targeting within the U.S. Department of Defense (DoD) and other Federal agencies. Likewise, foreign government agencies utilize them for similar purposes. Optical object tracking algorithms are also a component of commercial imagery analysis software.

In principle, object trackers can relieve human observers of continuously attending to the location of the object within the sensor imagery. However, fully automated tracking is still unrealized, as object trackers can lose or confuse tracks over the myriad of lighting and viewing conditions where the automated tracking may be deployed. For the foreseeable future, human observers will continue to play an important role in the tracking function. Instead of perfecting fully automated tracking, the present disclosure aims to improve collaboration between human observers and automated object trackers.

Due to object tracker limitations, delegating tracking functions between humans and automation is a dynamic process which depends on the quality of the imagery and viewing conditions. Judgements about delegation to an object tracker require assessment of object tracker performance. Existing object trackers do not communicate dynamic self-assessments of performance or tracking confidence to a user. This makes it difficult for a user to calibrate trust in the object tracker and make appropriate tracking delegation decisions from moment to moment during an object tracking event.

In addition, when tracking faults occur, existing object trackers do not alert the user they have ceased tracking. When an object tracker stops following an object, a box drawn around the designated object simply disappears. In addition, there is no information provided about why the tracking failure occurred.

According to aspects of the present disclosure, object tracking algorithms include important capabilities lacking in existing algorithms to enable dynamic collaboration with a user: (i) Tracker Fusion & Confidence Reporting; (ii) Scene Characterization & Fault Diagnosis; and (iii) Graphical User Interfaces with Alerting.

Tracker Fusion & Confidence Reporting: The proposed algorithms fuse three types of tracking modalities (features, motion, and motion estimation) and provide confidence values for feature tracking, motion tracking, and also image registration. These confidence values are normalized along a common scale and are used to coordinate weightings assigned to each tracker input. The confidence values are also used to communicate to the user the relative ability of the object tracking algorithm to continue following an object without user assistance. Low confidence situations trigger alerts to the user that object tracking is faltering. Tracker fusion of feature, motion, motion estimation, and associated confidence values, are implemented within a software prototype demonstrated with full motion video. At present, the image registration confidence measures are not implemented within a software prototype.

Scene Characterization & Fault Diagnosis: The proposed algorithms also monitor the object and scene for changes in viewpoint, illumination, partial or full occlusions, a lost track, and image registration failures. These changes and faults are communicated to the user in combination with tracking confidence information, and low confidence alerts often correlate with scenery changes. Thus the user is informed not only of approaching or actual tracking faults, but also the possible causes. Detections of lost tracks and image processing failures are represented within the software prototype.

Graphical User Interfaces with Alerting: The object tracker confidence measures and fault diagnosis are communicated to the user through an intuitive graphical user interface. The current confidence level is communicated in several ways along with notifications of tracking faults when they occur. The user is alerted to low confidence and fault states through a combination of visual and auditory alerts. The user is also able to preview the object tracker performance before delegating the tracking function to the automation. At present the user interface provides limited diagnosis of tracking faults.

In a context of the U.S. Air Force (USAF), the proposed object tracking innovations assist ISR collection and analysis activities. At least two possible users are envisioned, sensor operators and geospatial intelligence analysts. Using the proposed object tracker, sensor operators are relieved at times of continually steering a sensor to maintain line of sight with a moving object. Instead, the sensor stare point would be yoked to the object location as specified by the object tracker. This would free attention resources of sensor operators for other important activities such as anticipating object movements and configuring sensors to provide the desired picture. Likewise, intelligence analysts whose function is to watch and report on relevant scene activity could be relieved of visually tracking a single target object and devote more resources to interpreting the behavior of the moving object as well as others in the broader scene context. The proposed object tracking algorithms could be combined with mapping approaches to further automate the generation of vehicle stop reports which are a standard product of intelligence analysts in a Distributed Ground System (DGS).

A common Remotely Piloted Aircraft (RPA) Intelligence, Surveillance, and Reconnaissance (ISR) mission is to collect Full Motion Video (FMV) of areas and persons of interest to develop patterns of life where terrorist and insurgent groups operate. These missions can also transition to time-sensitive strikes of ground targets. One of the most frequent, important, and difficult components of pattern of life and strike missions is tracking the location and activities of a vehicle (e.g., often a passenger car, pickup, motorcycle). [1]; [2]; and [3]

Human Teamwork with Vehicle Tracking: A distributed team of USAF personnel is responsible for the common task of tracking objects of interest. In the RPA Ground Control Station (GCS) are the RPA Pilot and the Sensor Operator (SO) who work together to ensure the vehicle or area of interest remains in view in the FMV. The SO is tasked with configuring and steering the sensor to keep the vehicle of interest in view. The SO also ensures the desired image is achieved (magnification, selection of electro-optical (EO) or infrared (IR) mode, look angle, etc.) for the consumers of the FMV who are the Intel Analysts in a DGS. The DGS FMV Analysts are officially charged with interpreting and documenting ground activity. See TABLE 1 below. Nonetheless, the SO informally assists the FMV Analysts by clarifying the identity and activity of actors.

There are several DGS FMV Analysts assigned to each FMV feed and they rotate the role called "Eyes On" who continually observes the sensor view and verbalizes relevant events on the ground (termed "call outs"). Other DGS team members capture images of observed activity and produce intelligence products for the customer who requested the FMV mission. [1]

| Remotely Piloted Aircraft (RPA) | Distributed Ground Station (DGS) FMV Analyst |
|---|---|
| Look for potential targets | Observes target(s) |
| Steer sensor to track target, coordinating with RPA pilot, DGS, supported unit | Calls-out target events |
| Clarify identity of targets with DGS | Manages significant event time log |
| Achieve desired EO/IR image with DGS | Captures images for forensic analysis |
| Continuously observes FMV | Continuously observes FMV |
| Conducts long duration missions | Conducts long duration missions |

The SO and FMV Analyst share a common human performance challenge: They both continually observe the FMV feed for missions which can last hours. Continually tracking vehicles in complex terrain or in the presence of similar objects over long periods is fatiguing. The SO and FMV Analyst may miss relevant activity or lose visual lock due to a vigilance decrement. [4] The SO is a particularly critical tracking team member because the FMV feed arrives from the RPA several seconds sooner and is of higher quality than the FMV received by the DGS. Thus the SO is the best equipped team member to visually track the vehicle.

To address these human performance challenges with following vehicles, the USAF employs several tactics. In the DGS the Eyes On position is rotated with another FMV analyst after a prescribed period of 30 or 60 minutes. [1]; and [5]. The DGS is also able to rewind the recent FMV recording to perform forensic analysis of recent activity, such as when an object of interest is lost. During strike missions or if the vehicle is a high value target, multiple USAF personnel at the unmanned aerial vehicle (UAV) operations center and DGS site may watch the same sensor feed. This redundancy of observers protects against the possibility of any one or two people losing sight of the vehicle or other high value target. Another strategy employed by these observers is to physically trace the object on the FMV feed with a finger or pencil.

Automated Tracking Technology: There is automation technology to assist with tracking objects seen in the FMV. Optical object trackers are a computer vision application designed to detect and visually follow objects to increase visual saliency. Some generally-known object trackers are triggered by motion cues and will automatically draw a semi-transparent, boxlike symbol called a "bounding box" around any moving object. (For a more in-depth description of object tracking approaches, see [6]. This type of tracker does not usually maintain identity information about the object, so that if the object disappears and reappears in the view, the object tracker does not recognize it as the same object seen before. Other object trackers analyze the appearance of the object in order to establish a unique signature, such that the object may be distinguished from other objects and be reacquired if the object temporarily disappears from view. When using this type of object tracker, the SO specifies which object to watch by expanding a bounding box symbol around the object.

Object trackers can sometimes compensate for limitations with human visual attention. Once locked onto an object, the automated tracker can serve as another observer of the object proving an additional line of defense against a lost target. The bounding box provides a persistent visual indicator of the object location within the FMV feed that is seen by both the SO and the DGS crew. Although more commonly used by Sensor Operators, FMV Analysts in DGS could also employ object trackers to help build vehicle routing diagrams. The object trackers can also be configured to automatically capture images when the object performs certain behaviors such as stop, go, and turn.

In practice, however, object tracker technology is not nearly as robust as human vision in maintaining visual lock on objects such as cars or people in FMV. Generally-known object trackers can lose visual lock due to complexities in the environment such as object density, occlusions, clouds, smoke and haze. Object trackers are very sensitive to the image quality and FMV from RPAs can provide highly variable image quality. Intermittent image rates, blurring, smearing and other imagery anomalies can cause the object tracker to lose visual lock and prevent reacquisition. Finally, generally-known object trackers are also challenged by the ways the SO uses the sensor. Switches between daytime (color) imagery and infrared (IR) imagery, changes in magnification of the view, and dramatic slewing of the sensor can all disrupt the ability of the object tracker to visually follow a designated object.

Currently, object trackers are also poorly designed as a team member. The user must continually monitor the automation performance because it does not alert when it is struggling with processing imagery or has failed (i.e., no longer tracking the designated object). The only feedback given to the user is when the bounding box either moves off of the target or simply vanishes. Furthermore, current object trackers do not report diagnostic information during or after a tracking failure that might assist the user with understanding the competency boundaries of the automation. For example, object trackers could provide the user with diagnostic information that a "partial occlusion" is occurring as the designated target moves behind a row of trees along the road.

The inadequate amount of object tracker performance feedback leaves the user ill-equipped to appropriately calibrate trust and utilize the automation, often resulting in over- and under-reliance. While the user may intuit the competency boundaries of the automated tracker over extended situations of use, the momentary and immediate future performance of the tracker is opaque to the user. As a result, the user is challenged in making real time decisions about when the tracker can be relied upon to perform the tracking task. Without extensive training or experience with the object tracker, the user will be unaware of the reliability of the tracker under the current visual conditions. This reduces the potential usefulness of the object tracker as a relief aid when the human observer is fatigued.

Automation confidence is often included in frameworks of automation transparency, where transparency is a method for establishing shared awareness and shared intent between a human and a machine. [8]; [9]; and [10]. The Chen et al. model is unique in including temporal component of confidence information. Automation should not only communicate the present level of confidence in performance, but also the historical and projected future confidence in performance.

The present disclosure includes enhancements to object tracking technology so that more effective human-automation teaming is achieved. A primary advancement is object tracker machine confidence measures. The object tracker generates estimates of its ability to continue tracking the designated object of interest. Reporting self-assessment or automation confidence information may help a sensor operator better understand the automation performance and assess when the object tracker can be trusted and relied upon. Another advancement is automation detection and reporting by the object tracker of changes including object viewpoint, illumination, occlusions, image registration failures, and lost tracks. A further innovation is an intuitive user interface to communicate tracking confidence and tracking failures through salient visual and auditory displays. Each of these innovations is described in detail in the next section.

Tracker Fusion & Confidence Reporting: An object tracking framework was developed to create more robust automated tracking performance. The framework was developed to parallel the functions of the human visual system during object following events.

The human perceptual system influences the detection and tracking of vehicles. Humans recognize specific objects based on their visual features (contours, edges, colors, etc.), providing the ability to detect and track those features. This type of tracking works well when the features are unchanged during tracking, but in many scenarios, the features begin to change as the object moves through an environment and is viewed from different perspectives and different light angles and levels. The object also undergoes external changes as well, like partial occlusions. When the features begin to degrade, we must utilize a different tracking modality that does not depend on the features. This modality is motion, which is detected based on differences between the background and object foreground. Objects in our periphery are usually detected based on the motion cues of the object rather than the features. Once the alerted human focuses on the object, then features are obtained for detection and tracking. Motion and feature information provide complimentary cues for object detection and tracking. Motion detection does degrade during occlusion scenarios where some or all of the motion cues are absent, so another type of modality must be implemented. This modality is motion estimation, which utilizes the previous information about the track of the object to determine the future location of the object. When an object goes under an occlusion, the human perceptual system assumes the speed and direction of the object may continue without much change to these parameters. By estimating the speed and direction parameters we can estimate the object location moment to moment when it is not visible, then verify the object identity when the object motion or features are visible again at the predicted location.

Figure 2:
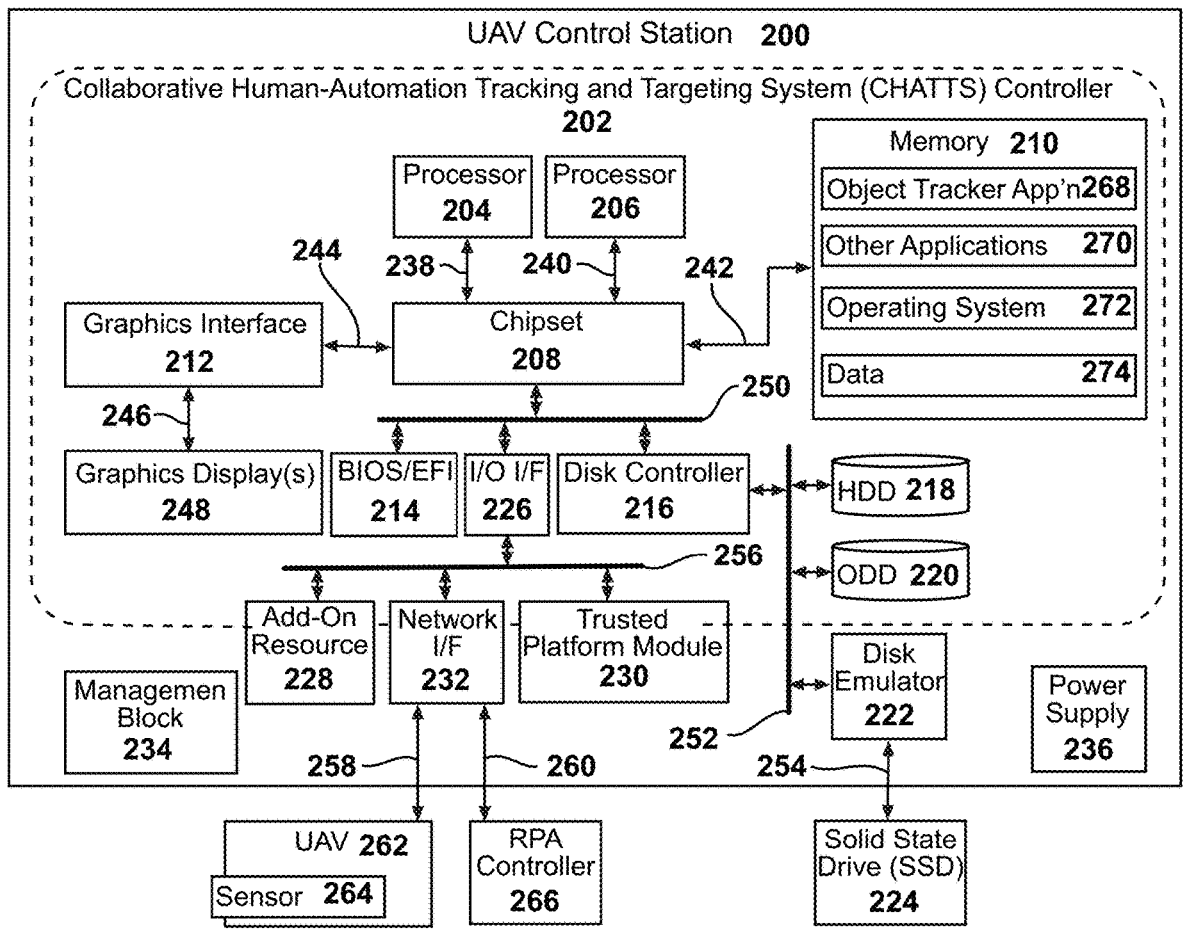
FIG. 2 is a diagrammatic illustration of an exemplary hardware and software environment of a UAV control station, according to one or more embodiments.

FIG. 2 is a diagrammatic illustration of an exemplary hardware and software environment of a UAV control station 200, such as UAV control station 110 (FIG. 1), customized to implement a collaborative human-automation tracking and targeting system (CHATTS) controller 202 consistent with embodiments of the innovation. UAV control station 200 is in part a customized information handling system (IHS) 100 that performs at least a part of the methodologies and features as described herein. UAV control station 200 can include processing resources for executing machine-executable code, such as a central processing unit (CPU), a programmable logic array (PLA), an embedded device such as a System-on-a-Chip (SoC), or other control logic hardware. UAV control station 200 can also include one or more computer-readable medium for storing machine-executable code, such as software or data. Additional components of UAV control station 200 can include one or more storage devices that can store machine-executable code, one or more communications ports for communicating with external devices, and various input and output (I/O) devices, such as a keyboard, a mouse, and a video display. UAV control station 200 can also include one or more interconnects or buses operable to transmit information between the various hardware components.

UAV control station 200 includes processors 204 and 206, chipset 208, memory 210, graphics interface 212, a basic input and output system/extensible firmware interface (BIOS/EFI) module 214, disk controller 216, hard disk drive (HDD) 218, optical disk drive (ODD) 220, disk emulator 222 connected to an external solid state drive (SSD) 224, input/output (I/O) interface (I/F) 226, one or more add-on resources 228, a trusted platform module (TPM) 230, network interface 232, management block 234, and power supply 236. Processors 204 and 206, chipset 208, memory 210, graphics interface 212, BIOS/EFI module 214, disk controller 216, HDD 218, ODD 220, disk emulator 222, SSD 224, I/O interface 226, add-on resources 228, TPM 230, and network interface 232 operate together to provide a host environment of UAV control station 200 that operates to provide the data processing functionality of the information handling system. The host environment operates to execute machine-executable code, including platform BIOS/EFI code, device firmware, operating system code, applications, programs, and the like, to perform the data processing tasks associated with UAV control station 200.

In a host environment, processor 204 is connected to chipset 208 via processor interface 238, and processor 206 is connected to the chipset 208 via processor interface 240. Memory 210 is connected to chipset 208 via a memory bus 242. Graphics interface 212 is connected to chipset 208 via a graphics bus 244, and provides a video display output 246 to graphical display(s) 248. In a particular embodiment, UAV control station 200 includes separate memories that are dedicated to each of processors 204 and 206 via separate memory interfaces. An example of memory 210 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 214, disk controller 216, and I/O interface 226 are connected to chipset 208 via an I/O channel 250. An example of I/O channel 250 includes a Peripheral Component Interconnect (PCI) interface, a PCI-Extended (PCI-X) interface, a high speed PCI-Express (PCIe) interface, another industry standard or proprietary communication interface, or a combination thereof. Chipset 208 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/EFI module 214 includes BIOS/EFI code operable to detect resources within UAV control station 200, to provide drivers for the resources, initialize the resources, and access the resources. BIOS/EFI module 214 includes code that operates to detect resources within UAV control station 200, to provide drivers for the resources, to initialize the resources, and to access the resources.

Disk controller 216 includes a disk interface 252 that connects the disk controller to HDD 218, to ODD 220, and to disk emulator 222. An example of disk interface 252 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 222 permits SSD 224 to be connected to UAV control station 200 via an external interface 254. An example of external interface 254 includes a USB interface, an IEEE 1394 (Firewire) interface, a proprietary interface, or a combination thereof. Alternatively, solid-state drive 164 can be disposed within UAV control station 200.

I/O interface 226 includes a peripheral interface 256 that connects the I/O interface to add-on resource 228, to TPM 230, and to network interface 232. Peripheral interface 256 can be the same type of interface as I/O channel 242, or can be a different type of interface. As such, I/O interface 226 extends the capacity of I/O channel 242 when peripheral interface 256 and the I/O channel are of the same type, and the I/O interface translates information from a format suitable to the I/O channel to a format suitable to the peripheral channel 256 when they are of a different type. Add-on resource 228 can include a data storage system, an additional graphics interface, a network interface card (NIC), a sound/video processing card, another add-on resource, or a combination thereof. Add-on resource 228 can be on a main circuit board, on separate circuit board or add-in card disposed within UAV control station 200, a device that is external to the information handling system, or a combination thereof.

Network interface 232 represents a NIC disposed within UAV control station 200, on a main circuit board of the information handling system, integrated onto another component such as chipset 208, in another suitable location, or a combination thereof. Network interface 232 includes network channels 258 and 260 that provide interfaces to devices that are external to UAV control station 200. In a particular embodiment, network channels 258 and 260 are of a different type than peripheral channel 256 and network interface 232 translates information from a format suitable to the peripheral channel to a format suitable to external devices. An example of network channels 258 and 260 includes InfiniB and channels, Fibre Channel channels, Gigabit Ethernet channels, proprietary channel architectures, or a combination thereof. Network channels 258 and 260 can be connected to external network resources (not illustrated). The network resource can include another information handling system, a data storage system, another network, a grid management system, another suitable resource, or a combination thereof. In an exemplary embodiment, network channel 258 is communicatively coupled to UAV 262 to directly adjust slaving of a sensor 264 or to perform other targeting. Network channel 260 is communicatively coupled to RPA control station 266 to indirectly adjust slaving of the sensor 264 or to perform other targeting.

Management block 234 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for UAV control station 200. In particular, management block 234 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of UAV control station 200, such as system cooling fans and power supplies. Management block 234 can include a network connection to an external management system, and the management block can communicate with the management system to report status information for UAV control station 200, to receive BIOS/UEFI or system firmware updates, or to perform other task for managing and controlling the operation of UAV control station 200. Management block 234 can operate off of a separate power plane from the components of the host environment so that the management block receives power to manage UAV control station 200 when the information handling system is otherwise shut down. An example of management block 234 may include a commercially available BMC product that operates in accordance with an Intelligent Platform Management Initiative (IPMI) specification. Management block 234 may further include associated memory devices, logic devices, security devices, or the like, as needed or desired.

Within memory 210, HDD 218, ODD 220, or SSD 224, one or more software and/or firmware modules and one or more sets of data can be stored that can be utilized during operations of UAV control station 200. These one or more software and/or firmware modules can be loaded into memory 210 during operation of UAV control station 200. Specifically, in one embodiment, memory 210 can include therein a plurality of such modules, including an object tracker application 268, one or more other applications 270, operating system (OS) 272, and data 274. These software and/or firmware modules have varying functionality as disclosed herein when their corresponding program code is executed by processors 204, 206.

Figure 3:
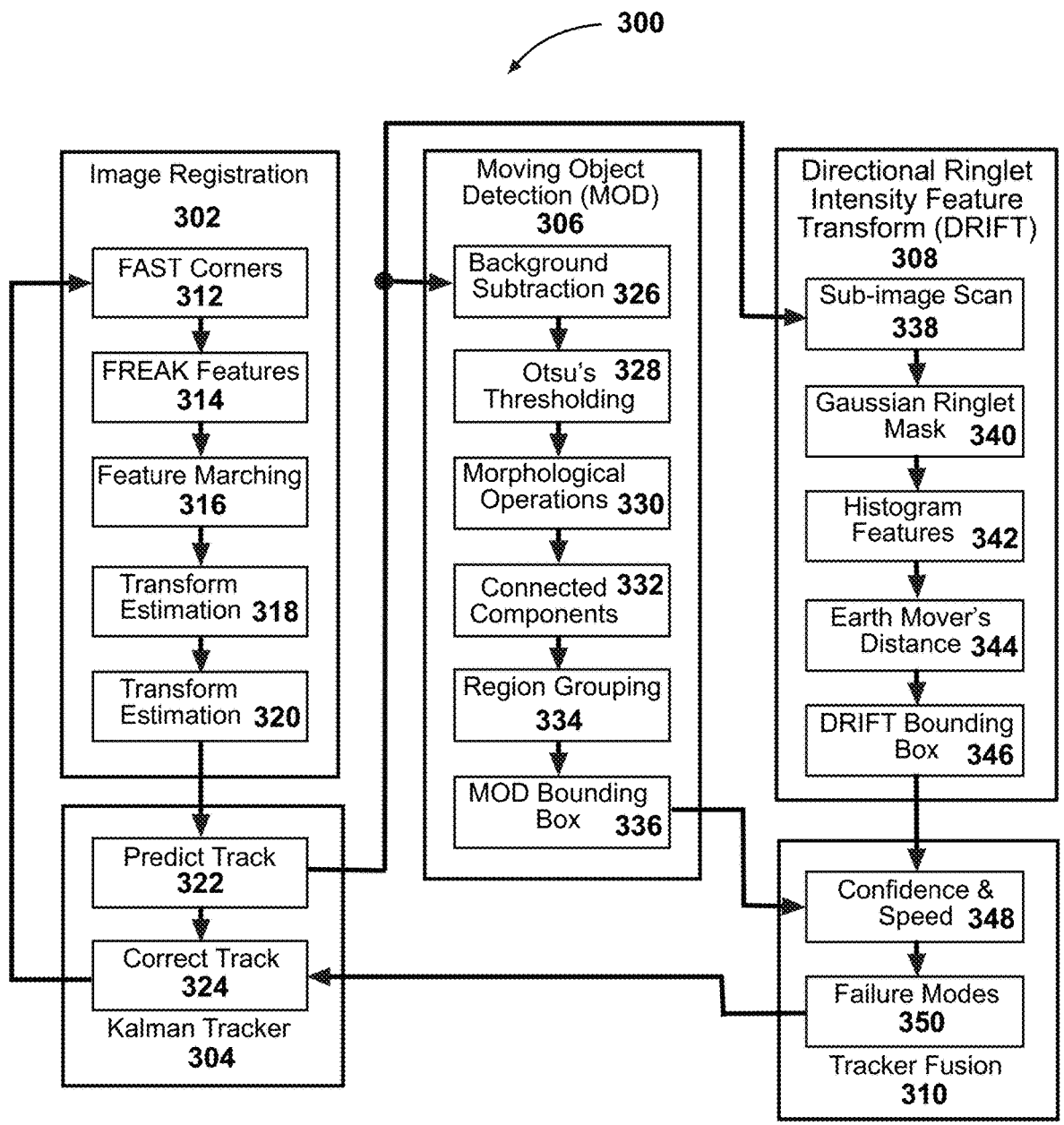
FIG. 3 is a flow diagram of an example framework of an object tracker, according to one or more embodiments.

FIG. 3 is a flow diagram of an example framework of object tracker 300. Several processes within the human visual processing system are paralleled in a novel object tracking framework. The framework 300 contains five (5) different algorithms that provide robust object tracking: (i) image registration 302; (ii) Kalman motion prediction tracking 304; (iii) moving object detection (MOD) 306; (iv) directional ringlet intensity feature transform (DRIFT) 308; and (v) tracker fusion 310.

The first algorithm that is used for object tracking is image registration 302, which stabilizes video for the rest of the algorithms. [11]; [12]; [13]; and [14]. The last algorithm is tracker fusion 310, which combines Kalman tracking, MOD, and DRIFT to find the best track of the vehicle.

Image Registration: Image registration 302 is vital in the detection and tracking of the objects of interest. Observing an object from a mobile platform causes changes in the image viewpoint, and the location of the object in one image versus another is different even if the object has not moved. In one or more embodiments, image registration 302 includes one or more of: (i) accelerated segment test (FAST) corners 312; (ii) fast retina keypoint (FREAK) features 314; (iii) feature matching 316; (iv) transform estimation 318; and (v) transform imagery 320. To accomplish the registration of the imagery and have the imagery stabilized through the imagery, Features from FAST corners 312 are detected in the image pair, which provide locations of distinct edges in each image. We then obtain FREAK features 314 based on a difference of Gaussians formed in a retinal orientation. Feature matching 316 matches these features in each pair of images using the match distance between features. Transform estimation 318 selects the optimal transform. Transform imagery 320 uses the optimal transform to transform the first image and all associated points to the image space of the second image.

Image Registration Confidence: For object trackers that utilize historical and geospatial information for detection and tracking, image registration is a necessary implementation to map the image space to link the information. The object tracker that has been developed utilizes image registration for historical information and motion information, which allows for deeper analysis of the object. With the image registration working well, many parts of the object tracking system work to supply the necessary analysis information. But, there are cases where the image registration fails, which disrupts the historical information linkage and the motion models used. A confidence score was developed for the image registration algorithm, which will notify the user of image registration failures. For different types of image registration algorithms, a confidence computation will need to be developed for each or the image registration used in our development, it uses a feature point matching scheme to find several matching points in the image to morph the previous image to the current image space. Therefore, there are three places of information that we can utilize from the image registration algorithm to create the confidence score: (i) number of feature points for each image; (ii) number of feature point matches; and (iii) in-frame matching.

Number of Feature Points: The image registration algorithm utilized in our object tracker detects various feature points within the image. To match feature points within the image, the algorithm must have a certain number of feature points to consider. In many cases, having more feature points in the image allows for more potential matches, so we have developed a threshold to determine the number of feature matches needed for the video. The thresholds can be set for the different sensor types used for the object detection and tracking scenarios.

$$\text{confidence} = \left(1 - \frac{testFeatures - refFeatures}{testFeatures}\right) \times 100$$

Number of Feature Point Matches: The next stage is to determine if the found features from the two images are matching. The current algorithm creates feature vectors for comparison and removes all non-matching components, leaving only points used for determining the image transform. Just like the previous threshold for the number of feature points, we have developed a threshold for the feature point matches.

$$\text{confidence} = \left(1 - \frac{testFeaturesMatches - refFeaturesMatches}{testFeaturesMatches}\right) \times 100$$

In-Frame Matching: This phenomena is found when there are matching features within one single frame, which are usually repeating patterns in video like road lines. The feature matching algorithm may be confused as to which features to match, so it usually finds the best match of the two to match the image. By determining any matching features within the image, we can determine if the image may get confused in registration, especially in poor registration conditions. The confidence value computation is shown below.

$$confidence = \left(\frac{inFrameFeatures - (matchFeatures/2)}{inFrameFeatures}\right) \times 100$$

Methods for combining these confidence scores are still under development. Once implemented, the image registration confidence reporting will provide users with increased understanding of the performance envelope of the object tracker under different viewing conditions.

Kalman Motion Prediction Tracking (Kalman Tracker 304): With the different object tracks, we utilize Kalman tracking to estimate the trajectory of the objects with predict track component 322, which helps with narrowing the search region for the object and reduces the computation time of the system. The estimation of the position and velocity (two-dimensions) can be found by using state space equations. The result can predict the next position with a constant velocity or even predict position and velocity with a constant acceleration, depending on the inputs. Due to the dynamic environment of the imagery, point transformations are done to register the position and velocity vectors on the moving imagery to give the best indication of the object movement. Kalman tracker 304 also includes correct track component 324 discussed below.

Moving Object Detection (MOD) Tracking (MOD 306): MOD 306 includes one or more of: (i) background subtraction 326; (ii) Otsu's thresholding 328; (iii) morphological operations 330; (iv) connected components 332; (v) region grouping 334; and (vi) MOD bounding box 336. Moving object detection utilizes the motion from frame to frame to develop the location of a specific object. Many types of moving object detection utilize a background model to find the foreground regions of the image. Once the image regions are found, processing is done to define the pixel regions and connect the regions together to form specific objects that have motion. There are three types of moving object tracking types: (i) point tracking; (ii) kernel tracking; and (iii) silhouette tracking. Point tracking utilizes a point determined by the region of interest, which is the center of the object. Kernel tracking uses shape and features to determine the tracking ability. Silhouette tracking utilizes shape matching to find the corresponding object.

When images are moving and features are changing, we can ascertain the observed object is the one of interest due to the object movement. When there is no movement in the object, the region of interest should not change. Even in high occlusion areas, we can safely assume that any moving portion in the vicinity of the previously detected object will be part of the object. Therefore, if we can merge motion detection and feature detection together, we can supplement information from both during the failure stages of the algorithms.

Depending on the video type, a background model could be much harder to obtain, especially with a mobile platform. Background models must be updated to encompass the image movement and new regions must be accounted for to fully utilize the benefits of motion tracking. The algorithm necessitates the use of image registration for registering the locations of the image that are not moving, though the imagery is moving. Therefore, moving object detection requires the accuracy of the registration method to be fairly high for the background model to be sufficiently updated and the foreground features to be highlighted. We utilize a simple background subtraction due to the mobile nature of the imagery which causes appearance changes from slight miss-registrations.

The moving object detection 306 first obtains an image subtraction between the pairs of registered images. Once the difference is obtained, we threshold the difference areas to get all moving objects in the scene. Due to the noise components found in the image registration, we must remove them with a series of morphological operations. First, we use 'closing' to remove any small movements due to registration errors. Lastly, we use 'opening' to merge moving portions that should be merge together. Using connected component analysis, we can determine all connected regions and provide a centroid for the moving region. Due to some connected components not being fully connected, we can provide an assumption of the search region and size of the object in order to connect components that are not connected but should be. This identifies all of the moving objects in the scene and can be used for object initialization, partial occlusion detection, and any other type of data that needs motion detection.

DRIFT Feature Tracker (DRIFT 308): DRIFT 304 includes one or more of: (i) sub-image scan 338; (ii) Gaussian ringlet mask 340; (iii) histogram features 342; (iv) earth mover's distance 344; and (v) DRIFT bounding box 346. The DRIFT features are able to detect an object of interest without any movement information. This feature-based tracker provides the ability to re-identify objects and continue tracking an object during normal conditions. The feature tracker uses Gaussian ringlets to partition the image region of the object for rotation invariance. [15]. The different features that can be used are intensity and gradient information. The gradient information can be obtained from kirsch masks, which find the directional gradient information from 8 different directions. The intensity and gradient information is then grouped in histograms and concatenated together to be used for evaluation between other feature sets. [16]. The comparison is done using earth mover's distance (EMD), which compares distributions from the reference and test histograms from the reference and test image respectively.

Tracker Fusion Based on Confidence: A confidence and speed component 348 of the tracker fusion algorithm 310 in use leverages the three types of object trackers described above which operate based on different object image parameters (DRIFT 308 for object features or appearance cues, Moving Object Detection 306, Kalman Motion Prediction tracking 304 for motion prediction). The DRIFT 308 and Moving Object Detection trackers 306 generate confidence values as an approximation of the performance of the tracker type. Confidence as defined here is an estimate of the likelihood the object being tracked is the one designated as the target by the user. The object tracking confidence values are dynamic and changes based on the estimated performance of the object tracker while following a vehicle. Failure mode component 350 of tracker fusion 310 determines what type of failure has occurred based on the reported confidence levels.

When dealing with feature trackers and moving object detection, there are changing conditions that can change the confidence in the algorithm. The following equation shows the confidence based on the DRIFT feature tracker.

$$confidence = \left(1 - \frac{testDistance - refDistance}{testDistance}\right) \times 100$$

where refDist is the difference between two reference images in near frames and testDist is the difference between the reference detection and the current frame detection. The basis of this equation is on the difference between features when a new detection is found. Due to not having a ground truth for comparison, the only assumption that can be made is the newly found track should not have a changing distance greater than an observed change found in the beginning stages. Even though this may fail with very small changes found in the beginning, the reference distance can be updated and even a manifold can be created based on the confidence found in the imagery.

The following equation shows the confidence based on the Moving Object Detection:

$$\text{confidence} = \left(1 - \frac{testArea - refArea}{testArea}\right) \times 100$$

where refArea is the reference moving object detection area and testDist is the current frame's moving object detection area. Given that there are two different confidences that are calculated, we can derive the total confidence based on the maximum confidence between both trackers.

The basis of this equation is the difference between features when a new detection is found. Due to not having a ground truth for comparison, the only assumption that can be made is the newly found track should not have a changing distance greater than an observed change found in the beginning stages. Even though this may fail with very small changes found in the beginning, the reference distance can be updated and even a manifold can be created based on the confidence found in the imagery.

The normalized confidence values of the DRIFT and Moving Object Detection trackers are used to coordinate with each other and the Kalman Motion Prediction tracker, as well as the human user. A binary weighting is applied to each tracker output based on the confidence level of the DRIFT feature and Moving Object Detection trackers. However, fusion algorithms incorporating non-binary weighting are under development.

Referring to TABLE 2, if the DRIFT feature tracker has a confidence level of 80% or greater, the location estimate provided by the DRIFT feature tracker is given a weight of 1.0 and the other two trackers are given a weight of 0.0. If the DRIFT confidence is 79% or less and the moving object detection tracker confidence is 50% or greater, the location estimate of the moving object detection tracker receives a weight of 1.0 and the other two trackers receive a weight of 0.0. If the confidence value of the moving object detection tracker is between 26% and 49% and the DRIFT tracker confidence is 79% or less, the motion prediction tracker estimate of the object location is given a weight of 1.0 and the other two trackers receive a weight of 0.0. When the Moving Object Detection confidence drops below 25%, all tracking operations cease.

TABLE 2

Object Tracking Weighting Approach.

| Feature Confidence | Motion Confidence | Feature Tracker Weight | Motion Tracker Weight | Kalman Tracker Weight |
|---|---|---|---|---|
| >80% | NA | 1 | 0 | 0 |
| <=80% | 50% to 100% | 0 | 1 | 0 |
| NA | 26% to 49% | 0 | 0 | 1 |
| NA | 0 to 25%* | 0 | 0 | 0 |

*Stop all tracking processes until confidence regained

Scene Characterization and Fault Diagnosis: The proposed algorithms also self-diagnose the nature of low confidence situations where the tracker performance is compromised. In the current software implementation, the two basic tracking failures are losing the object, and unsuccessful processing of the visual imagery as a whole. These tracking faults are communicated to the user in combination with low confidence alerting.

In addition, a diagnosis of the possible reasons for object loss or image processing failures can also communicated so the user better understands the circumstances that gave rise to the tracking faults. The tracking algorithms provide the necessary information to not only report confidence information, but also reasons for low confidence. Reporting the estimated causation for low confidence events helps the user develop a deeper understanding over time of the performance envelope of the object tracker under various viewing situations. We have identified several tracking situations that can be diagnosed using information collected and generated by the tracking algorithms: Normal, Viewpoint Changes, Illumination Changes, Partial/Full Occlusions, Lost Track, and Failed Image Registration. The following information is used to diagnose these tracking situations: (i) Feature Confidence; (ii) Motion Confidence; (iii) Image Registration Confidence; (iv) Trajectory; and (v) Mean Color.

For each tracking situation or mode, we will describe how this information is used in combination to diagnose the situation.

Normal: During ideal operation of the object tracker, the various components should process normally resulting in relatively unchanged confidence values. Normal tracking situations are diagnosed when feature detection and motion detection confidence is high. When an object is being tracked, the features do not normally change drastically and are usually moving in the same direction.

During a normal tracking mode, the user can safely assume that the tracker is performing well and the user can trust the object tracker to follow the designated object. This mode generally operates in clear visual conditions without any obstruction of the object. We can create a threshold for the confidence values as to when the object track leaves the normal mode due to changing conditions. This threshold could be adjusted by the user. The characterization of a normal scene is shown in the TABLE 3 below.

TABLE 3

| Information Type | Characterization |
|---|---|
| Feature Confidence | High Confidence |
| Motion Confidence | High Confidence |
| Image Registration Confidence | High Confidence |
| Trajectory | Unchanging |
| Mean Color | Unchanging |

Figure 4:
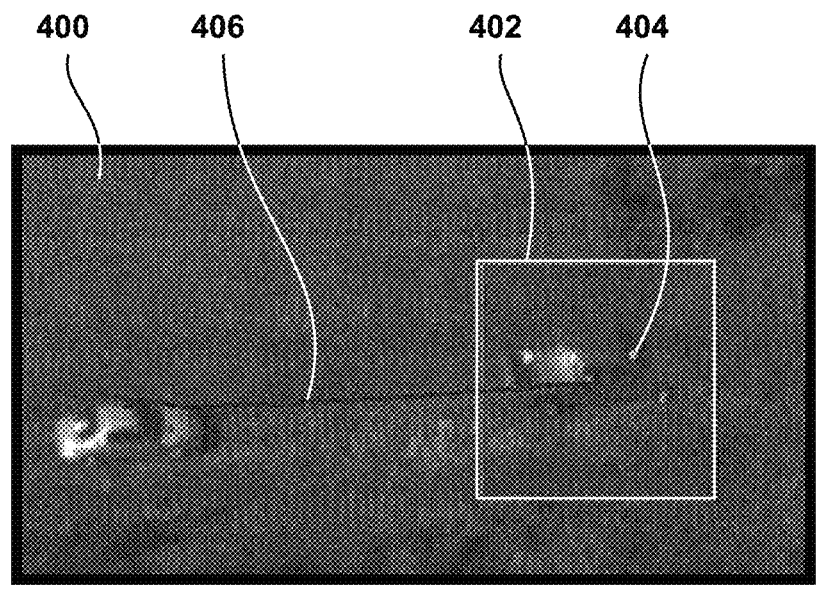
FIG. 4 is an example video image of a normal tracking situation, according to one or more embodiments.

FIG. 4 is an example image 400 of a normal tracking situation. Information overlays include bounding box 402 around designated tracked object 404, and a line 406 behind the object 404 tracing the path history. The object 404 should be in full view and does not change trajectory, moving in a constant direction. The object track 406 does not undergo any drastic changes within the object which allows for the user to be fully confident in the object track 406.

Viewpoint Changes: With the normal operation mode, features and motion information is relatively unchanged through the track of the vehicle. The algorithms have built-in update schemes to update the feature and motion models of the track 406 to keep tracking the object 404. When a viewpoint change occurs, the features of the object 404 do change slightly and the motion profile may change slightly, but usually not beyond the allocated threshold. In addition small shifts in feature and motion confidence, viewpoint change is identified by the speed and direction of the track 406 with respect to the imagery. The algorithms have the ability to calculate the trajectory of the object 404 based on the different positions of the object 404 with respect to the imagery. The combination of trajectory angle and changes in confidence within the track 406 will allow the characterization of viewpoint changes.

This tracking mode is helpful for the user in reorienting and reacquiring the object following a period of inattentiveness to the video feed. Although the tracker may be tracking the object 404 adequately, the user may not recognize the object 404 any longer due to the changing appearance of the object 404. Different viewpoints of the object 404 may create entirely different features, which may confuse the user if the user is not paying attention to the evolution of the object features. Therefore, it is necessary to notify the user of the changing viewpoints so that the user can direct attention to the video and update his own awareness of the object appearance, which in turn will assure the user that the object tracker is continuing to follow the same object 404. The characterization of the viewpoint change is shown in TABLE 4 below.

TABLE 4

| Information Type | Characterization |
| --- | --- |
| Feature Confidence | Medium Confidence |
| Motion Confidence | High Confidence |
| Image Registration Confidence | High Confidence |
| Trajectory | Changing |
| Mean Color | Unchanging |

Figure 5:
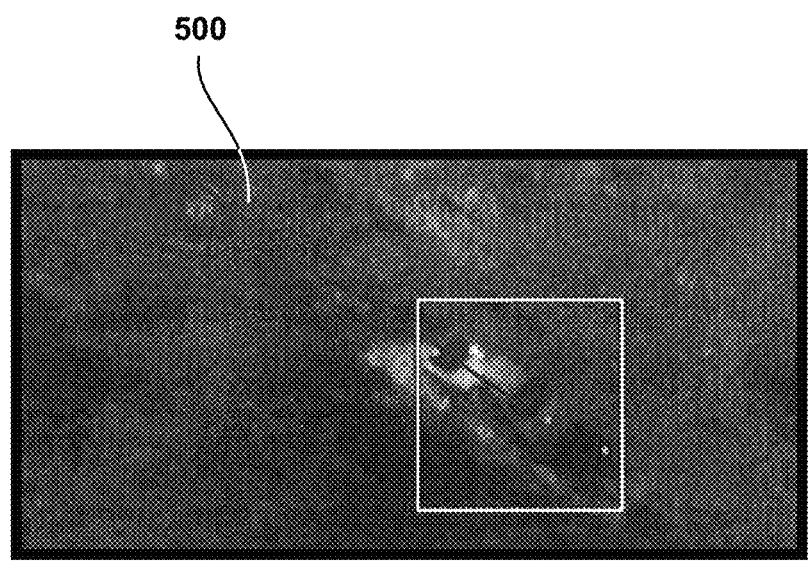
FIG. 5 is an example of an example video image having a viewpoint change of the object of FIG. 4, according to one or more embodiments.

FIG. 5 is an example of an image 500 having a viewpoint change of object 404' with respect to object 404 (FIG. 4). The vehicle is viewed from a different orientation, which may confuse the user if attention was directed elsewhere for a time while the orientation was changing. Notifying the user as the viewpoint is changing provides the user with an opportunity to see the object appearance evolve.

Illumination Changes: Illumination changes have similar effects on object appearance as viewpoint changes, and they often co-occur. Illumination can change based on cloud coverage and shadowing of nearby objects, as well as change in object trajectory or viewpoint which alters the lighting upon the object surface. Although the object looks similar, it may be sufficiently different to confuse the user and under some conditions, may also cause the object tracker to lose the track. Illumination change can be assessed based on features (medium to low confidence), trajectory information (unchanging or changing), mean color (changing), and motion confidence (high).

The motion model should be fairly constant within the illumination change, creating a similar blob in both normal operating conditions and shadow regions. We can also see that the trajectory of the object may not drastically change for the object. However, the mean color typically changes. The mean color of the object can be generated for each detection of each frame and can then be used to determine the color changes of the object. Only in an illumination change does the color move in a certain direction. The characterization of the mode is shown in TABLE 5 below.

TABLE 5

| Information Type | Characterization |
| --- | --- |
| Feature Confidence | Medium/Low Confidence |
| Motion Confidence | High Confidence |
| Image Registration Confidence | High Confidence |
| Trajectory | Unchanging or Changing |
| Mean Color | Changing |

Figure 6:
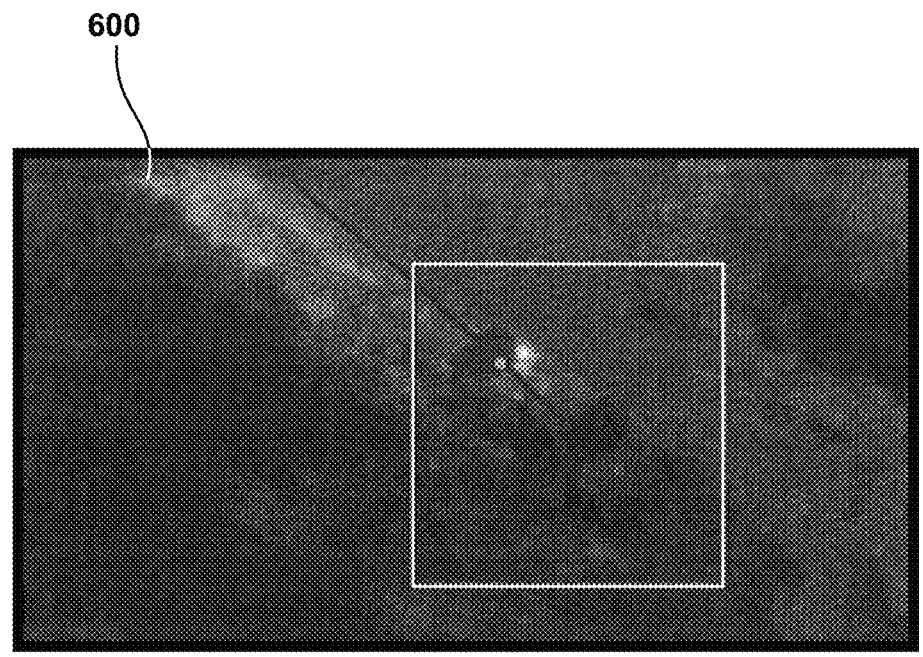
FIG. 6 is an example video image having an illumination change of the object of FIG. 5, according to one or more embodiments.

FIG. 6 is an example image 600 of an illumination change of object 404" with respect to object 404' (FIG. 5). The features may change with the object 404", but that is due to the lowered illumination of the object 404". With illumination changes the object 404" may continue along the same trajectory, but the object 404" remains still visible with changes in mean color. Although the color change may look like a partial occlusions on the object, the object's motion model still will be fairly good with a high confidence, thus characterizing an illumination change.

Partial/Full Occlusion: An occlusion occurs when background scenery (such as a building or hill) or another object (such as trees) blocks the view of the object of interest in whole or in part. An occlusion can be diagnosed by the confidence values of the different parts of the algorithm. During an occlusion, feature tracking confidence usually dips because some or all of the features of the object observed in a prior frame cannot be found in the current frame. During partial occlusions, motion confidence is low but some portions of the object image motion are still visible to the tracker. During full occlusions, the motion model is completely gone. In all cases, a motion estimator is used to estimate the track of the object because both the feature tracking and motion models fail to adequately find and track the object.

The motion estimation algorithm is the only suitable algorithm to determine the trajectory of the object. But this type of occlusion reporting is time sensitive. The occlusion period can sometimes be larger than anticipated, thus confusing the tracker in the ability to report the correct information. An occlusion that happens in a shorter duration can still be tracked, but, but as the time grows longer, the object is more considered a lost track. The characterization of an occlusion situation is shown in the TABLE 6 below.

TABLE 6

| Type | Characterization |
| --- | --- |
| Feature Confidence | Low Confidence |
| Motion Confidence | Low Confidence |
| Image Registration Confidence | High Confidence |
| Trajectory | Only Motion Estimation |
| Mean Color | N/A |

Figure 7:
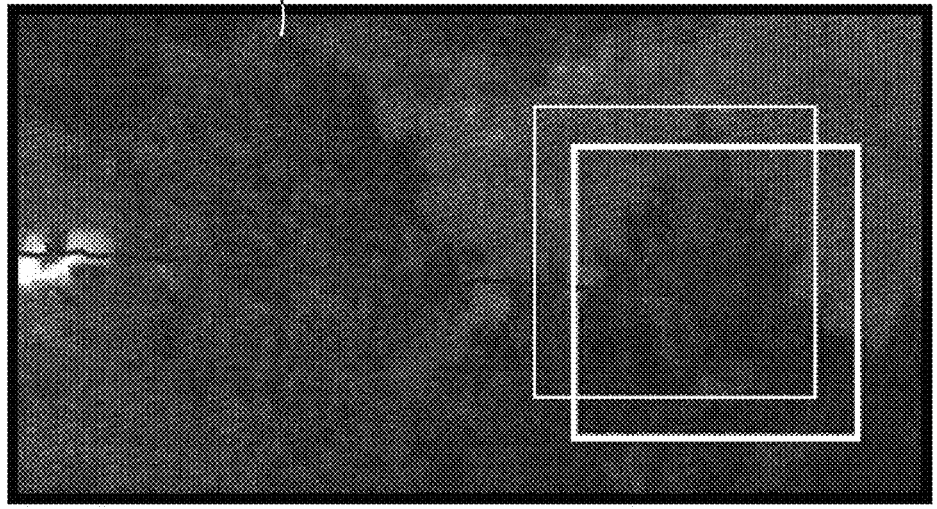
FIG. 7 is an example video image of a full occlusion of the object by trees, according to one or more embodiments.

FIG. 7 is a video depiction of an image 700 of a full occlusion of the object by trees. The feature and motion confidence dips below the threshold and cannot be detected.

The trajectory of the object can be judged using various estimators, but the object cannot be detected when it is occluded. For short duration occlusions, like the trees seen in the figure, we can trust the motion estimation model to help estimate the track beyond the occlusions. That is, the motion model will likely result in a reacquisition of the object once it emerges from the occlusion. However, the certainty of reacquiring the object based on the motion estimation models drops as a function of occlusion time.

Lost Track: The lost track mode is diagnosed when the features and motion models of the object are unable to find the object after some time. Both confidence values will be low. What differs from the occlusion mode is the duration of the lost track. This threshold between occlusion and lost track can be determined by the user as a temporal threshold. In some cases, even though the tracker may lose the features and motion of the object, the tracker has not permanently lost the track of the object and may still reacquire it. The characterization of the mode is shown in the TABLE 7 below.

TABLE 7

| Type | Characterization |
|---|---|
| Feature Confidence | Low Confidence |
| Motion Confidence | Low Confidence |
| Image Registration Confidence | High Confidence |
| Trajectory | Only Motion Estimation for extend period |
| Mean Color | N/A |

Failed Image Registration: Image registration is the most crucial aspect of tracking an object with a specific reference point. The image registration algorithm is able to provide historical data of the object trajectory and place it within the feature space that is available for the user, like the GIS feature space. The tracking algorithms do not work as well when the historical object trajectory data is lost. This is yet another situation to notify the user about when it occurs. Failed image registration is a general notification that the image quality is poor and the object tracker is unlikely to function well until the image quality improves. Image registration confidence is a key variable in diagnosing the image registration failure situation. The characterization of the failure mode is shown in TABLE 8 below.

TABLE 8

| Type | Characterization |
|---|---|
| Feature Confidence | Low Confidence |
| Motion Confidence | Low Confidence |
| Image Registration Confidence | Low Confidence |
| Trajectory | Drastic Change |
| Mean Color | N/A |

Figure 8:
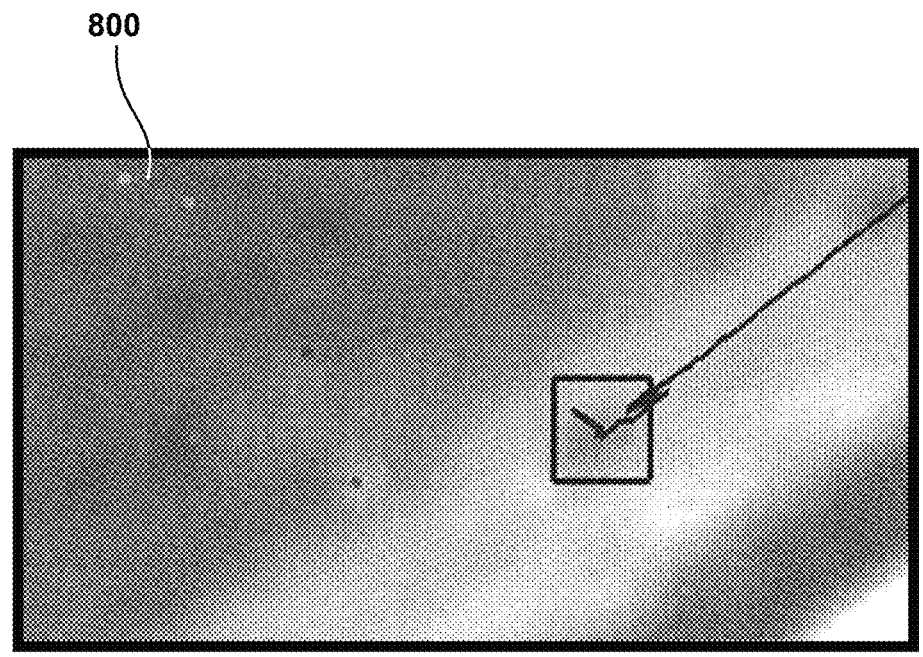
FIG. 8 is an example video image of a failed image registration event, according to one or more embodiments.

FIG. 8 is an example image 800 of a failed image registration event. Within the previous images the background and object features were discernable, with a fairly distinct tracking point. With more focused images the algorithm is usually able to register the points of the object, which can be characterized by the image registration algorithm. Once the object and background features are no longer distinct, or are out of view, the algorithm is unable to register the image, thus destroying the tracks that were previously created. There are methodologies to discard bad image registration occurrences, but it requires a development of frame history.

Scene Characterization Usage: The value of diagnosing and reporting these tracking modes is in providing information to the user about the changing nature of the visual scene. Informing the user about changes to the scene primes the user to sample the video feed and update his own model of the object appearance. Informing about shifting tracking modes they occur also increases user awareness of scene changes that may degrade the automated tracking, helping the user make real-time decisions on whether to trust the object tracker or pay closer attention to the video feed. Over time, as the user experiences sees the tracking situation emerge under different viewing conditions, the user becomes more aware of the performance limitations of the object tracker. This informed awareness allows the user to properly calibrate trust in the algorithm and make better decisions about when to reply upon it.

The different tracking modes or situations can be assessed using the information currently generated by the tracking architecture. However, not all of the tracking situations and modes are currently diagnosed and reported within the software prototype. In addition, the development of additional types of tracking modes is ongoing to encompass a wider range of viewing conditions. We are developing new algorithms that provide further insight to the scenarios that are presented by the tracking algorithm.

Graphical User Interfaces with Alerting:

This section describes the manner in which object tracker data is portrayed to the user. This includes portrayal of tracking confidence measures and also general tracking fault situations. In addition, interaction modes with the object tracker are also described, whereby the user may opt to manually track an object of interest or delegate the tracking function to automation. The user interface has been implemented within a software demonstration. Diagnosis of scene changes and tracking faults is limited to lost tracks and image processing failures.

Confidence Displays and Alerts: Human performance studies evaluating the impact of machine confidence on trust in automation reveal different ways of portraying automation confidence. Lyons expressed confidence information about an emergency landing plan as a simple percentage measure displayed as text. Lyons, J. B., Koltai, K. S., Ho, N. T., Johnson, W. B., Smith, D. E., & Shively, J. R. (2016). Mercado and colleagues used categorical levels of confidence, expressed through color coding (green, yellow, red) and opacity levels of UxV icons. [17]; and [18].

The present disclosure for portraying object tracker confidence displays the information graphically as both a continuous measure (percentage) and a categorical (color code) measure. The percentage displayed to the user is the highest confidence level of the three object trackers. The color code is green when the DRIFT feature tracker is weighted 1.0, yellow when the Moving Object Detection tracker is weighted 1.0, and red when the Kalman Motion Prediction object tracker is weighted 1.0. Audio alarms are also used to indicate when the automation has low confidence. Both the current and historical confidence information is displayed to the user in several ways, including information overlays on the FMV.

Figure 9:
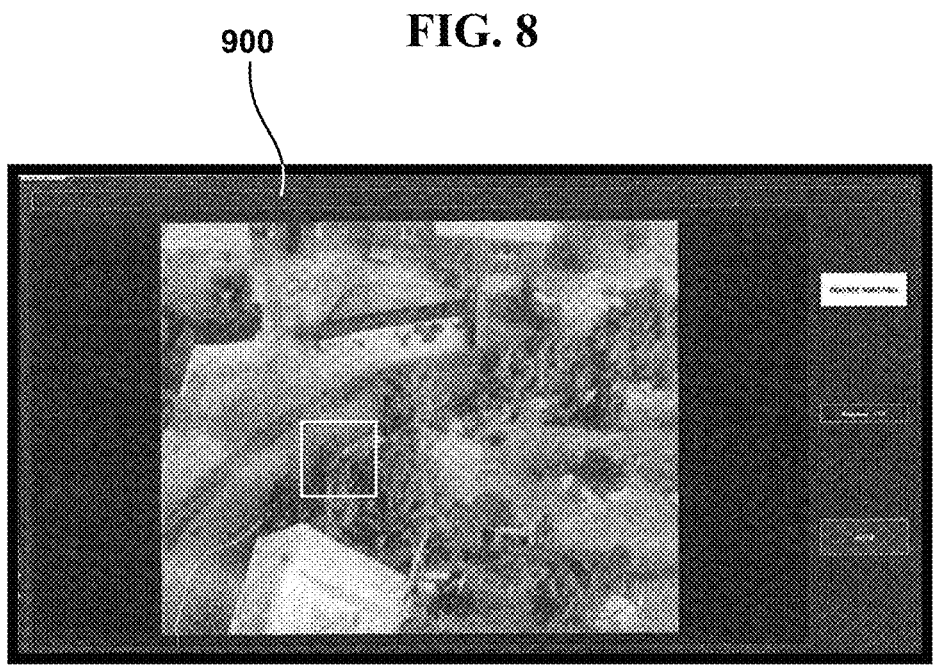
FIG. 9 is a depiction of a user interface having an example video image with object tracker confidence information indicating high confidence, according to one or more embodiments.
Figure 10:
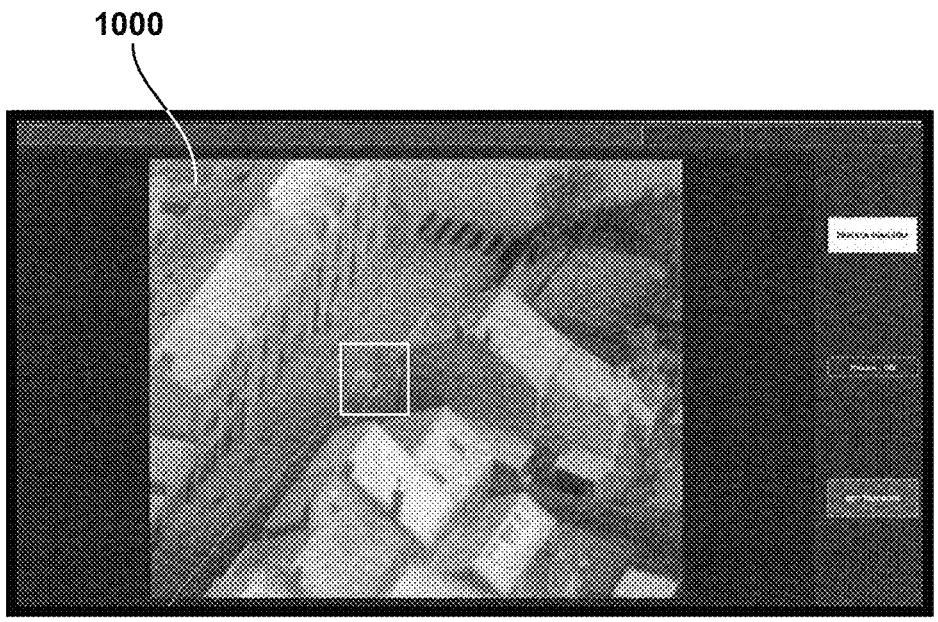
FIG. 10 is a depiction of a user interface having an example video image with object tracker confidence information indicating medium confidence, according to one or more embodiments.
Figure 11:
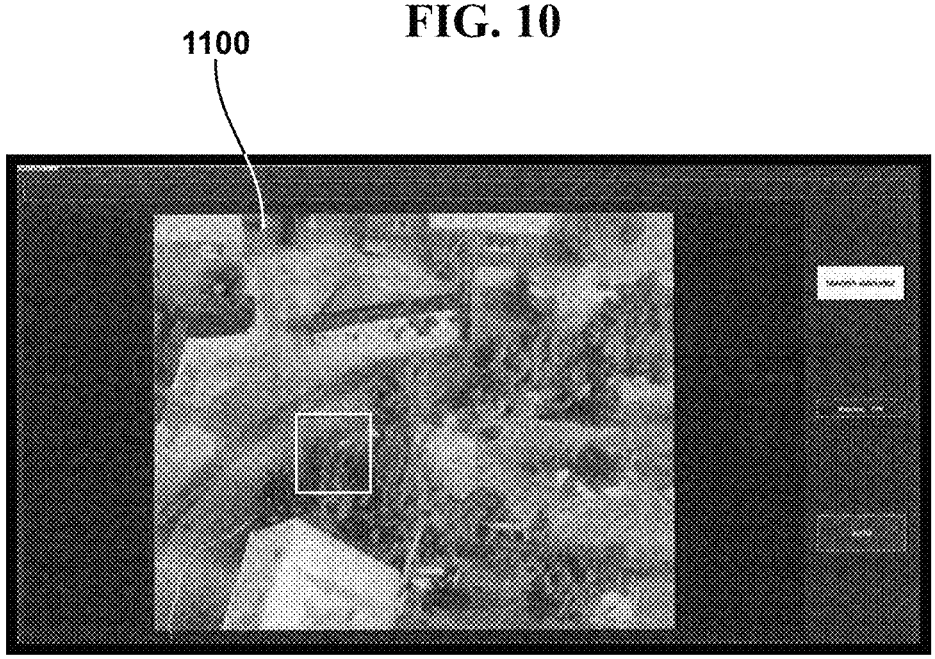
FIG. 11 is a depiction of a user interface having an example video image with object tracker confidence information indicating low confidence, according to one or more embodiments.

FIGS. 9-11 are images 900, 1000, 1100 respectively illustrating three examples of object tracker confidence information 902, 1002, 1102 displayed in a tracking task panel 700. There are several ways confidence is portrayed, with some redundancy. First is the Confidence Strip Display, which is found above the FMV display on the Tracking Task Panel. The amount of the strip that is filled indicates the relative degree of object tracker confidence: more fill equals higher confidence. The Confidence Strip Display has three segmented areas corresponding to low, medium, and high confidence. When confidence is high, the strip fills up the first (low confidence), second (medium confidence), and a portion of the third (high confidence) segment. The color of the strip is green as long as confidence is high, as shown in FIG. 9 in the top of the three tracking task panels. The color of the strip becomes yellow when the confidence level strip fills up the first (low confidence) and a portion of the second (medium confidence) segment. This is shown in the image 1000 of FIG. 10.

Image 1100 in FIG. 11 shows the color of the strip is red when confidence is in the low range, and the strip only fills up a portion of the first segment. Another way confidence is portrayed is the color of the borders of the tracking task panel. The border remains white in color when object tracker confidence is medium or high. When confidence is low, the border of the tracking display is colored red (see borders of bottom panel in FIG. 4). This same border color approach could be featured around task panels on other display monitors in order to draw the attention of the object tracker user back to the FMV. Low confidence situations are accompanied by an auditory alarm, which begins after the object tracker has remained in low confidence situation for at least one second.

A third way confidence is portrayed is on the bounding box, which the object tracker draws around the estimated location of the object being followed (a vehicle in the example shown). The color outline of the box corresponds to the current, relative confidence of the object tracker. Finally, notice the line drawn behind the box, which is called the Confidence Path History. The Confidence Path History shows two things: the historical estimated location of the vehicle, and the relative confidence level of the object tracker at each point along the estimated vehicle path. An informal title for the line is a snail trail. As the vehicle moves it leaves behind a trail which is colored based on the momentary object tracker confidence at that time and location within the FMV. The trail remains visible as long as the relevant area on the ground is visible.

In FIGS. 9-11, the respective path history 904, 1004, 1104 provides an indirect references to current and historic confidence as well. The path history of the vehicle is more accurate when confidence is high (smoothly arcing path along the road) versus when confidence is medium or low (wavy or erratic path). Thus, the relative smoothness of the path history is an indirect indicator of object tracker confidence as the vehicle travels.

Tracking State Indicators and Alerts: A simple indicator box on the right side of the tracking task panel indicates the mode of tracking, which includes "No Tracking" 906, "Manual" 908, and "Auto" 906. These indications refer to several different states of the object tracker, and transitions between these states and accompanying alerts represent additional innovations in human interaction with object trackers. State transition alerts can serve to supplement low confidence alerts.

The present disclosure supports manual (human directed) tracking, or automated tracking. If the user wishes to display a bounding box around the object, the user positions a cursor over the vehicle. Some object tracker approaches supply a tool to expand a bounding box around an object to follow. Other approaches will auto-detect the object when the user clicks on the object. In the current implementation, clicking on the object and pressing the left mouse button causes the object tracker to automatically search for and detect an object and begin creating a bounding box around the object, sizing it based on the size of the object image, and periodically resizing if the object changes size and shape in the FMV. This manual tracking bounding box is colored blue and the tracking mode indicator states "Manual Tracking." The bounding box position moves wherever the user positions the mouse in the FMV and continues to display as long as the user holds down the left mouse button.

Figure 12:
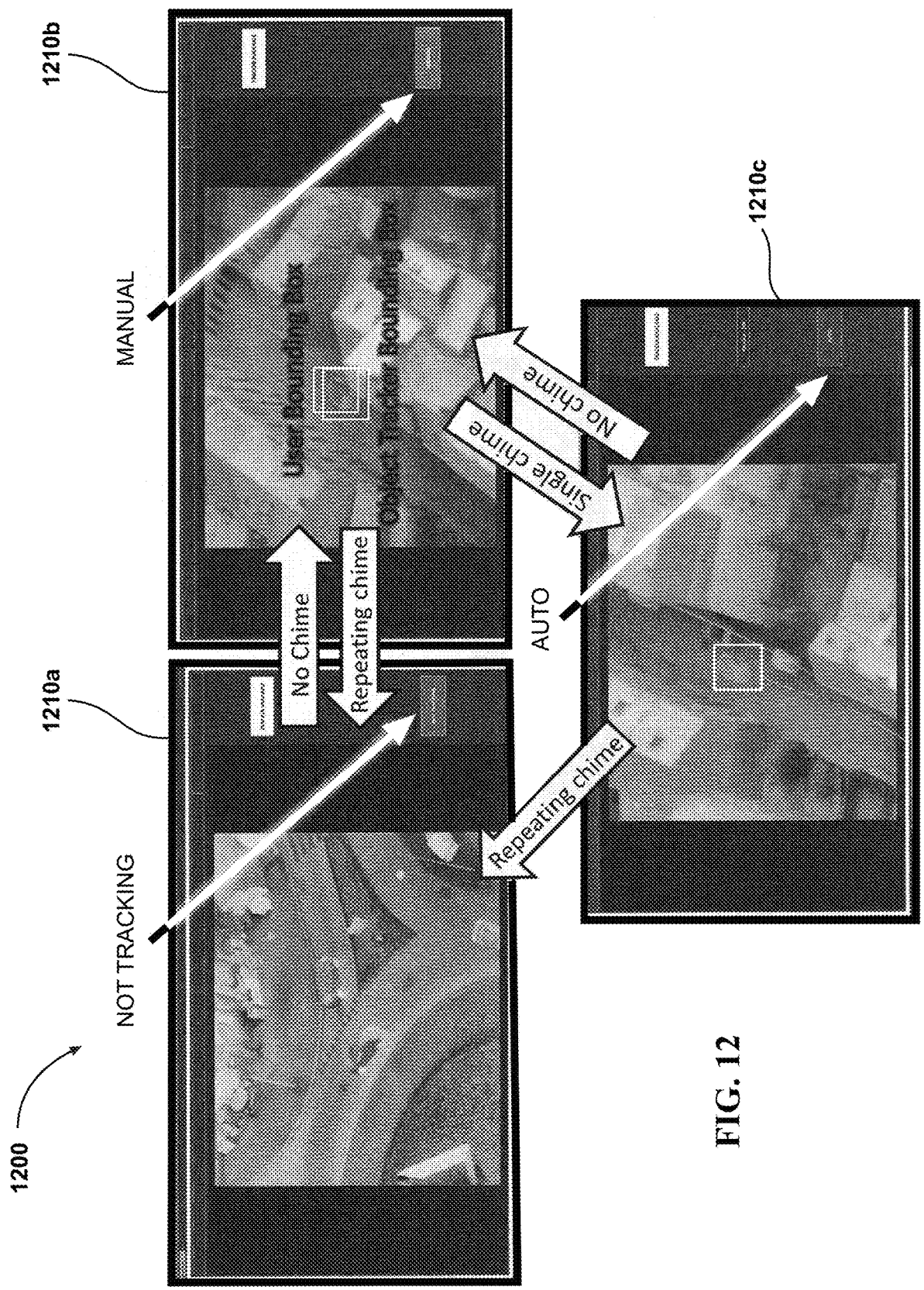
FIG. 12 is a state diagram that illustrates example user interface (UI) presentations respectively for "not tracking", "manual", and "auto" modes of object tracker of FIG. 3, according to one or more embodiments.

If the object tracker successfully acquires the object, it displays a second bounding box which is colored purple. The bounding box is offset several pixels from the user bounding box so they may be distinguished from each other. At this point however, the user has not yet delegated the tracking function to the object tracker. FIG. 12 is a state diagram 1200 that illustrates example user interface (UI) presentations 1210a-c respectively for "not tracking", "manual", and "auto" modes of object tracker 300 (FIG. 3). (UI) presentations 1210a-c include tracking states, transitions, and alerting chimes The participant may hand-off the tracking task to the object tracker. To hand-off to the object tracker, the participant discontinues manually tracking by briefly pressing the space bar on the keyboard. This initiates the automated object tracking mode is engaged and the tracking mode indicator boxes changes from "Manual" to "Auto." The object tracker bounding box changes from purple to the color of the current relative confidence level (green, yellow, or red). The bottom screen capture in FIG. 12 (1210c) shows the appearance of the interface during "Auto" tracking mode. At any point the participant can intervene and regain control of the tracking task. To do this the participant begins manually tracking which disengages the object tracker. The tracking mode indicator switches from "Auto" to "Manual" and the purple bounding box is removed, and a blue bounding box is drawn.

The third state of "No Tracking" is entered either when the user discontinues manually tracking, or the object tracker which has been delegated to follow an object can no longer locate the designated object. When the vehicle is no longer visible to the object tracker, it automatically searches for the vehicle which is aided by a motion prediction algorithm. The object tracker predicts the estimated location of the vehicle moment to moment based on the last known position, direction of movement, and speed. This constrains the search space for the object tracker. This can occur under a variety of circumstances, such as when the vehicle disappears from view while driving under a bridge and is not reacquired when the object emerges again.

The search for the vehicle by the object tracker can result in reacquisition of the correct vehicle, no reacquisition, or in rarer cases the object tracker acquires a different vehicle visible in the FMV. When the object tracker can no longer locate the vehicle, the tracking state switches to "No Tracking" and audio chime begins to play and replay every three (3) seconds until the user manually tracks and/or designates again the object to follow. The switch from "Auto" tracking to "No Tracking" is the implicit diagnosis that the track has been lost. When a lost object event occurs, the participant can reset the tracker to follow the correct object again by re-designating the object. UI presentation 1210a is the appearance of the user interface during "No Tracking" mode.

Note that the audio alert associated with the transition to "No Tracking" is a separate, independent assessment of object tracking performance in addition to the low confidence alerts. This is an important distinction, because the low confidence alerts may occur before an object is lost, providing an early warning the object could be lost. The low confidence alerts may occur at the moment the object is lost, or the low confidence alert may not occur at all when the object is lost. Likewise, it is possible the object tracker begins to follow a different than the one designated, and in such circumstances confidence may be relatively high and the object tracker remains in the "Auto" tracking state.

Figure 13:
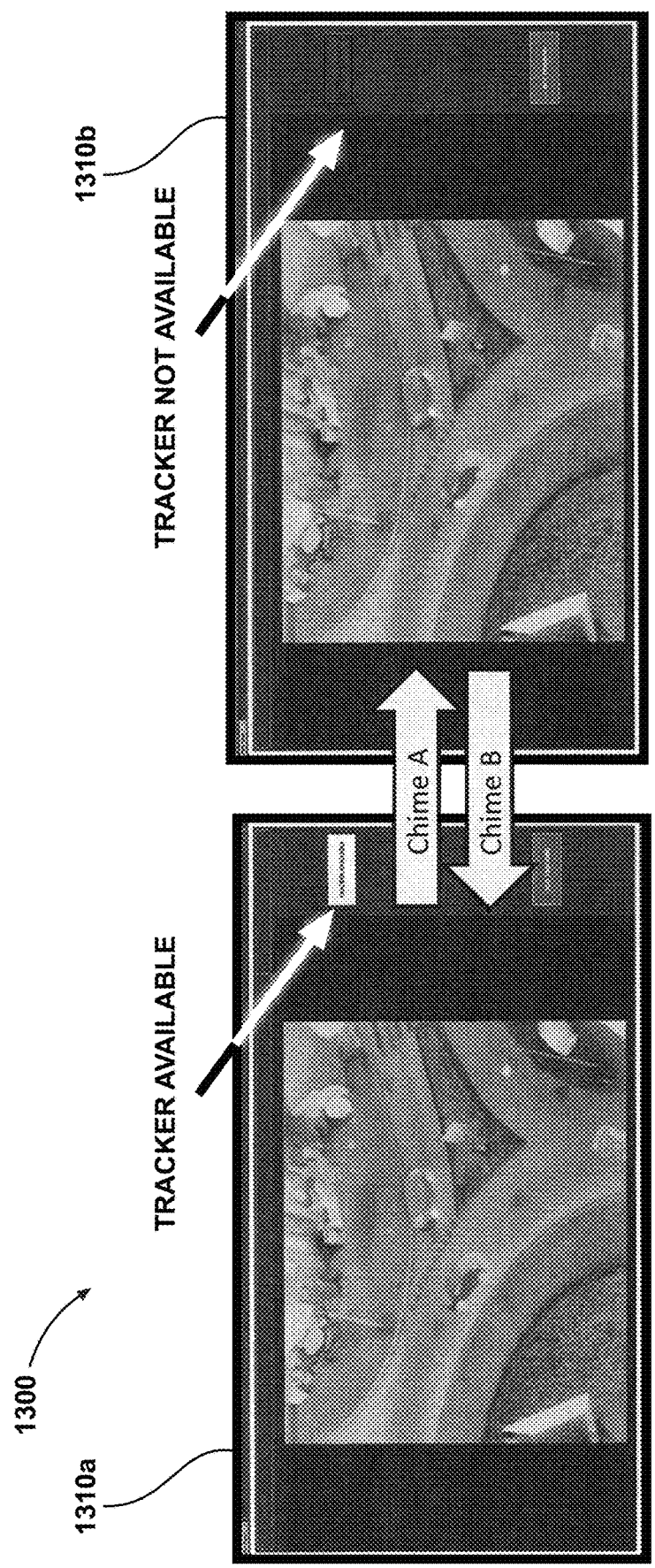
FIG. 13 is a state diagram that illustrates UI presentations having an indicator box which states "Tracker Unavailable" or "Tracker Available" based on whether the image registration process was successful, according to one or more embodiments.

Tracker Availability Indicators and Alerts: There are also failures where the object tracker cannot immediately reacquire the target even with user help, because the video quality is poor. Video quality can be sufficiently degraded to the point the object tracker cannot function until video quality improves. During these failures, the participant may attempt a reset but the object tracker will not reacquire the object. Within traditional user interfaces, the user must repeatedly attempt to designate the object to see whether the video quality has improved enough for the object tracker to acquire the target. FIG. 13 is a state diagram 1300 that illustrates UI presentations 1310a-b having indicator box 1320 which states "Tracker Unavailable" or "Tracker Available" based on whether the image registration process was successful. The transition between these states is also signaled by a unique chime. These two indicators alert the participant to when the image registration has succeeded or failed, providing the user greater insight into the nature of the object tracker performance and when the user can handoff tracking to the object tracker, and when intervention is needed.

Object Tracker Preview Mode: When the image registration process is successful, the user designates the target and the object tracker successfully acquires the target, there is still remaining the delegation of the tracking function to the object tracker. During this interlude there is another innovative capability which allows the user to see the object tracker confidence before delegating the tracking function to the automation. This is called the "Preview Mode" and when this mode is engaged, the purple bounding box is instead colored the current confidence level of the object tracker. The Confidence Strip Display and Confidence Path History also populate with data. The value to the user is to see the relative performance of the object tracker before delegating the tracking function.

Figure 14:
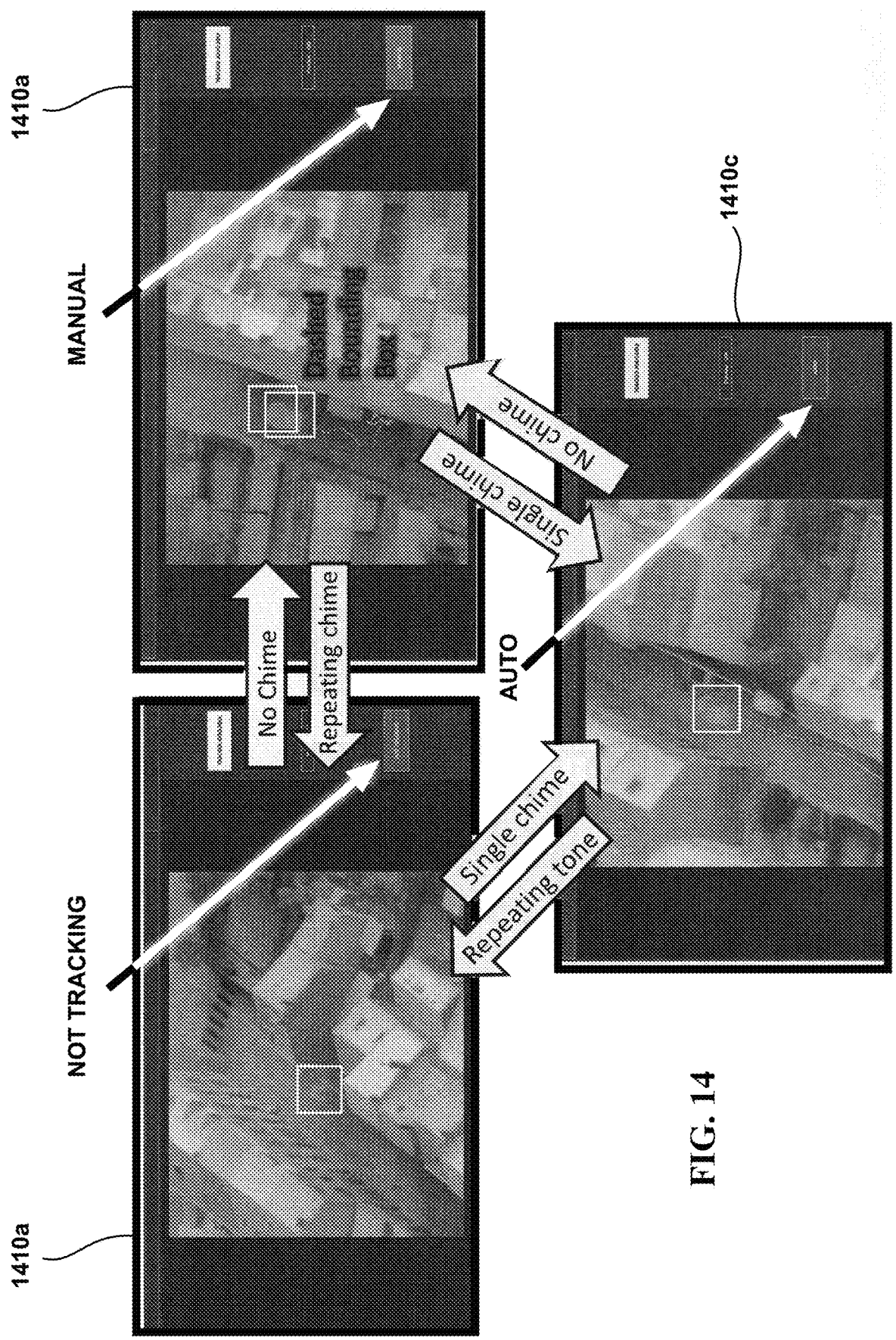
FIG. 14 is a state diagram illustrating UI presentations that show the different tracking states when Preview Mode is on, according to one or more embodiments.

FIG. 14 is a state diagram 1400 illustrating UI presentations 1410a-c that show the different tracking states when the Preview Mode is on. To distinguish the Preview Mode from the auto tracking mode, the line for the bounding box is dashed rather than solid. This bounding box remains dashed until the user delegates tracking to the automation. Note, however, that if the user discontinues manually tracking (1410a), the tracking mode will switch to "Not Tracking" and the object tracker bounding box and confidence information does not display again until the user designates the target again. The Preview Mode can be turned on or off by pressing a designated key. FIG. 12 shows the appearance of the user interface in different tracking states when Preview Mode is off, and FIG. 13 shows the appearance when Preview Mode is on.

User Interface Innovation Summary: TABLE 9 summarizes the differences between traditional object tracker interfaces and the proposed user interface invention. These differences are described in the context of different types of object tracker performance situations and user actions.

TABLE 9

| | Object Tracker User Interface | |
|---|---|---|
| Situation | Traditional | Proposed |
| User Designates Object to Follow | Bounding Box created by User Around Object | Bounding Box created by User Around Object (Blue Color) Tracking Mode reads "Manual" |
| Object Tracker Successfully Acquires Object | No Indicators | Preview Mode On/Off:     Second Bounding Box Appears around     Object, colored Purple Preview Mode On:     Confidence Displays Begin to     Populate         Confidence Strip Display         Confidence Path History |
| User Successfully Hands-Off Object Tracking | Bounding Box Around Object Remains after User Hands-Off | Blue Bounding Box Removed, Purple Bounding Box Remains Single Audio Chime indicating Successful Delegation to Object Tracker Tracking Mode reads "Auto" Confidence Displays Begin to Populate     Confidence Strip Display     Bounding Box Color     Confidence Path History |
| Object Tracker Indicates Relative Performance | Bounding Box Appears Around Designated Object Relative Overlap of Bounding Box with Object | Bounding Box Appears Around Designated Object Relative Overlap of Bounding Box with Object Object Tracker Confidence Displays     Confidence Strip Display     Bounding Box Color     Confidence Path History Low Confidence Alerting     Audio Chime, repeating during low     confidence period     Red Border Drawn Around Interface     Panel     (Option) Red Border Around Other     Task Panels |

TABLE 9-continued

Object Tracker User Interface

| Situation | Traditional | Proposed |
|---|---|---|
| Object Tracker Loses Object | Loss of Bounding Box | Loss of Bounding Box<br>Tracking Mode Indicator reads "No Tracking"<br>Repeating Audio Chime Until User Designates Object Again by Manually Tracking |
| Tracker Unable to Process Video | Loss of Bounding Box (if Object Tracker was Following)<br>Bounding Box Does Not Remain When Designating Object | Loss of Bounding Box (if Object Tracker was Following)<br>Bounding Box Does Not Remain When Designating Object<br>Tracker Availability reads "Tracker Unavailable"<br>Repeating Audio Chime Until User Designates Object Again by Manually Tracking |
| Tracker Able to Process Video | Bounding Box Remains After Designating Object | Bounding Box Color Switches from Blue (for manual tracking) to Purple after user designates object<br>Tracker Availability reads "Tracker Available"<br>Transition from "Tracker Unavailable" to "Tracker Available" accompanied by Audio Chime |

Manner and Process of Making and Using the Present Innovation: Object tracking algorithms are coded in Matlab and the User Interface resides within the Vigilant Spirit Control Station. The tracking algorithms are demonstrated using archived video within the software prototype.

Alternatives: Object tracking algorithms could be coded alternatively in C++ or other programming language. Likewise the User Interface could be coded within a different environment. The specific representations of confidence information and the visual and auditory alerts could be designed in a variety of alternative ways. The tracking algorithms could be used with real-time full motion video to follow a moving object, and the algorithms could also be used with archived video for forensic analysis of object movements.

Figure 15:
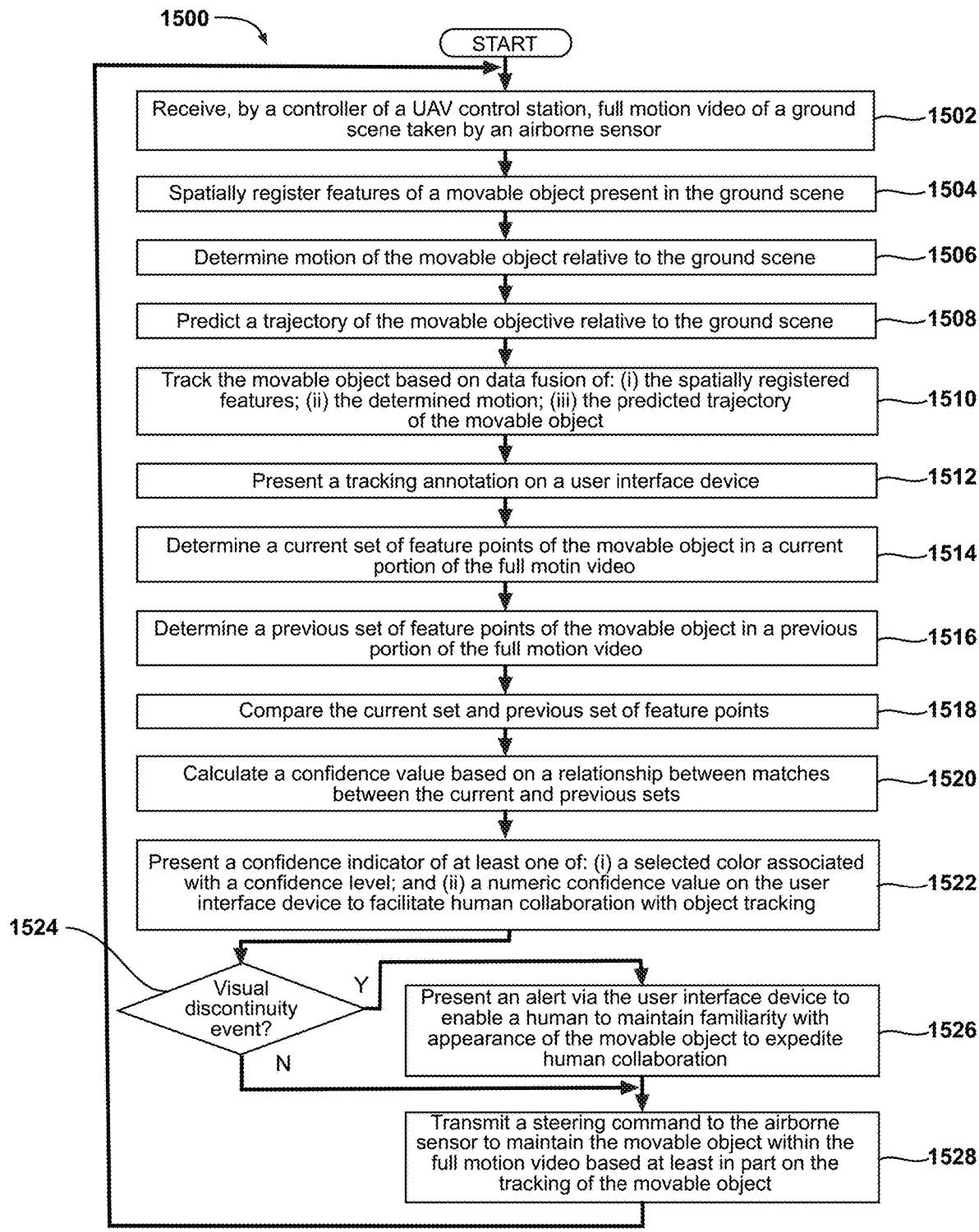
FIG. 15 is a flow diagram illustrating method of enabling efficient human collaboration with automated object tracking, according to one or more embodiments.

FIG. 15 is a flow diagram illustrating method 1500 of enabling efficient human collaboration with automated object tracking. In one or more embodiments, method 1500 includes receiving, by a controller of a UAV control station, full motion video of a ground scene taken by an airborne sensor (block 1502). Method 1500 includes spatially registering features of a movable object present in the ground scene (block 1504). Method 1500 includes determining motion of the movable object relative to the ground scene (block 1506). Method 1500 includes predicting a trajectory of the movable objective relative to the ground scene (block 1508). Method 1500 includes tracking the movable object based on data fusion of: (i) the spatially registered features; (ii) the determined motion; and (iii) the predicted trajectory of the movable object (block 1510). Method 1500 includes presenting a tracking annotation on a user interface device (block 1512).

Method 1500 includes determining a confidence value of the tracking of the movable object. In particular, method 1500 includes determining a current set of feature points of the movable object in a current portion of the full motion video (block 1514). Method 1500 includes determining a previous set of feature points of the movable object in a previous portion of the full motion video (block 1516). Method 1500 includes comparing the current set and previous set of feature points (block 1518). Method 1500 includes calculating a confidence value based on a relationship between matches between the current and previous sets (block 1520). Method 1500 includes presenting a confidence indicator of at least one of: (i) a selected color associated with a confidence level; and (ii) a numeric confidence value on the user interface device to facilitate human collaboration with object tracking (block 1522).

Method 1500 includes determining whether a visual discontinuity event of at least one: (i) relative orientation; and (ii) lighting of the movable object is occurring (decision block 1524). In response to determining that the visual continuity event is occurring, method 1500 includes presenting an alert via the user interface device to enable a human to maintain familiarity with appearance of the movable object to expedite human collaboration (block 1526). In response to determining that the visual continuity event is not occurring in decision block 1524 or after performing block 1526, method 1500 includes transmitting a steering command to the airborne sensor to maintain the movable object within the full motion video based at least in part on the tracking of the movable object (block 1528). Then method 1500 returns to block 1502.

The following references that are cited above are hereby incorporated by reference in their entirety:

[1] Behymer, K., Kancler, D., Stansifer, C., Cone, S., & McCloskey, M. (2013). A Cognitive Work Analysis and Visit to the 497th Intelligence, Surveillance and Reconnaissance Group—Langley AFB, VA. Technical Report AFRL-RH-WP-TR-2013-0121, Wright Patterson AFB, Ohio.

[2] Jones, W., & Graley, J. (2012). AFRL Support for AFSOC PED Analyst Needs: Available and Emerging Technology Programs to Improve Mission Outcomes. Technical Report AFRL-RH-WP-TR-2012-0020, Wright Patterson AFB, Ohio.

[3] Turner, K., Stansifer, C., Stanard, T., Harrison, T., & Lauback, D. (2013). A Cognitive Analysis of the 27th Special Operations Group—Cannon AFB, NM. Technical Report AFRL-RH-WP-TR-2013-0144, Wright Patterson AFB, Ohio.

[4] McCloskey, M. J., O'Connor, M. P., Stansifer, C. M., Harrison, T. P., Gorham, B. D., Seibert, B. A., Horvath, G. P., Zelik, & Ocampo, S. M. (2015). Innovative Contested, Degraded, Operationally-limited (CDO) Environment Analysis Characteristics, Challenges, and Support Concepts Across the Air Force Distributed Common Ground System (DCGS) Enterprise. Technical Report FRL-RH-WP-TR-2015-0025, Wright Patterson AFB, Ohio.

[5] McCloskey, M., Behymer, K., O'Connor, M., & Kuperman, G. (2012). A Cognitive Study of the Analysis Task Performance within the 181st Intelligence Wing. Technical Report AFRL-RH-WP-TR-2012-0166, Wright Patterson AFB, Ohio.

[6] For a more in-depth description of object tracking approaches, see Smeulders, Chu, Cucchiara, Calderara, Dehghan, and Shah (2013).

[7] Although more commonly used by Sensor Operators, FMV Analysts in DGS could also employ object trackers to help build vehicle routing diagrams. The object trackers can also be configured to automatically capture images when the object performs certain behaviors such as stop, go, and turn.

[8] Lyons, J. B., Koltai, K. S., Ho, N. T., Johnson, W. B., Smith, D. E., & Shively, J. R. (2016). Engineering Trust in Complex Automated Systems. Ergonomics in Design, 24, 13-17.

[9] Lyons, J. B. (2013). Being transparent about transparency: A model for human-robot interaction. In D. Sofge, D., G. J. Kruijff, G. J., & W. F. Lawless (eds.), Trust and Automation Systems: Papers from the AAAI spring symposium. Technical Report SS-13-07), AAAI Press, Menlo Park, Calif.

[10] Chen, J. Y. C., Procci, M., Boyce, J., Wright, A., Garcia, & Barnes, M. (2014). Situation Awareness-Based Agent Transparency. Technical Report ARL-TR-6905, Aberdeen Proving Ground, Md.

[11] Jackovitz, K., & Asari, V. K. (2012) "Registration of region of interest for object tracking applications in wide area motion imagery," Proceedings of the IEEE Computer Society Workshop on Applied Imagery and Pattern Recognition—AIPR 2012, pp. 1-8, Washington, D.C., 09-11 Oct. 2012. (IEEE).

[12] Mathew, A., & Asari, V. K. (2013) "Tracking small targets in wide area motion imagery data," Proceedings of IS&T/SPIE International Conference on Electronic Imaging: Video Surveillance and Transportation Imaging Applications, San Francisco, Calif., USA, vol. 8402, pp. 840205:1-9, 3-7 Feb. 2013. (IS&T/SPIE).

[13] Santhaseelan, V. & Asari, V. K. (2014) "Moving object detection and tracking in wide area motion imagery," Wide Area Surveillance: Real Time Motion Detection Systems, Edited by Vijayan K. Asari, Chapter 3, Springer Book Series: Augmented Vision and Reality, Series Editors: Riad I. Hammoud and Lawrence B. Wolff, Springer, DOI: 10.1007/8612_2012_9, vol. 6, pp. 49-70, 2014.

[14] Krieger, E., Sidike, P., Aspiras, T., & Asari, V. K. (2015) "Directional ringlet intensity feature transform for tracking," in Image Processing (ICIP), 2015 IEEE International Conference on. IEEE, 2015, pp. 3871-3875.

[15] Aspiras, T., Asari, V. K., & Vasquez, J. (2014) "Gaussian ringlet intensity distribution (grid) features for rotation-invariant object detection in wide area motion imagery," in Image Processing (ICIP), 2014 IEEE International Conference on. IEEE, 2014, pp. 2309-2313.

[16] Mathew, A., & Asari, V. K. (2012) "Local histogram based descriptor for object tracking in wide area motion imagery," International Journal of Information Processing, vol. 6, no. 4, pp. 1-12, 2012. (IJIP).

[17] Mercado, J. E., M. A. Rupp, J. Y. C. Chen, M. J. Barnes, D. Barber, and K. Procci. (2016). Intelligent Agent Transparency in Human-Agent Teaming for Multi-UxV Management. Human Factors, 58(3), 401-415.

[18] McGuirl, J. M., & Sarter, N. B. (2006). Supporting trust calibration and the effective use of decision aids by presenting dynamic system confidence information. Human Factors, 48 (4), 656-665.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of enabling efficient human collaboration with automated object tracking, the method comprising:
    receiving full motion video of a ground scene taken by an airborne sensor;
    spatially registering features of a movable object present in the ground scene;
    determining motion of the movable object relative to the ground scene;
    predicting a trajectory of the movable object relative to the ground scene;
    tracking the movable object based on data fusion of: (i) the spatially registered features; (ii) the determined motion; and (iii) the predicted trajectory of the movable object;
    presenting a tracking annotation on a user interface device;
    determining a confidence value of the tracking of the movable object;
    presenting a current confidence indicator and at least one of historical and projected future confidence in performance on the user interface device to facilitate human collaboration with object tracking without over- and under-reliance on the object tracker;
    determining whether the confidence value is below a minimum confidence threshold; and
    in response to determining that the confidence is below the minimum confidence threshold:
        determining whether the confidence level is below the minimum confidence threshold based on one or more contributing factors from a group consisting of: (i) view change; (ii) illumination change; (iii) partial/full occlusion; (iv) lost track; and (v) failed image registration; and
        presenting the one or more contributing factors via the user interface device to help the user develop a deeper understanding over time of the performance envelope of the object tracker under various viewing situations.

2. The method of claim 1, further comprising transmitting a steering command to the airborne sensor to maintain the movable object within the full motion video based at least in part on the tracking of the movable object.

3. The method of claim 2, further comprising:
    determining whether a visual discontinuity event of at least one: (i) relative orientation; and (ii) lighting of the movable object is occurring for the movable object that remains within a field of view of the airborne sensor; and
    in response to determining that the visual continuity event is occurring, presenting an alert via the user interface device, the alert capable of being perceived by a user that is not paying attention to the ground scene to enable a human to maintain familiarity with appearance of the movable object to expedite human collaboration.

4. The method of claim 3, wherein the alert comprises a confidence strip display that is presented on the user interface device outside of the ground scene.

5. The method of claim 3, wherein the alert comprises an auditory alarm that is an early warning that the movable object could be lost by the object tracker in the immediate future.

6. The method of claim 3, wherein the alert comprises a confidence path history presented on the ground historical based on historical estimated locations of the movable object.

7. The method of claim 3, further comprising:
    presenting the full motion view and tracking annotation on a first display of a control station; and
    presenting the alert on a second display of the control station.

8. The method of claim 1, wherein presenting the confidence indicator comprises presenting at least one of: (i) a selected color associated with a confidence level; and (ii) a numeric confidence value.

9. The method of claim 1, wherein determining the confidence value comprises:
    determining a current set of feature points of the movable object in a current portion of the full motion video;
    determining a previous set of feature points of the movable object in a previous portion of the full motion video;
    comparing the current set and previous set of feature points; and
    calculating the confidence value based on a relationship between matches between the current and previous sets.

10. The method of claim 1, wherein determining and presenting the confidence value of the tracking of the movable object comprises:
    determining whether a fault has occurred that presents automated tracking; and
    in response to determining that the fault has occurred, presenting the confidence indicator comprising the fault occurrence on the user interface device to expedite human collaboration with object tracking.

11. A system that enables efficient human collaboration with automated object tracking, the system comprising:
    an aerial vehicle having an airborne sensor; and
    a control station communicatively coupled to the aerial vehicle to:
        receive full motion video of a ground scene taken by the airborne sensor;
        present the ground scene on a user interface device;
        receive a user input that indicates the movable object on the ground annotate a manual tracking annotation on the user interface device that corresponds to the user input;
searching for a movable object within a portion of the ground scene corresponding to the user input;
spatially register features of the movable object present in the ground scene;
determine motion of the movable object relative to the ground scene;
predict a trajectory of the movable object relative to the ground scene;
track the movable object based on data fusion of: (i) the spatially registered features; (ii) the determined motion; and (iii) the predicted trajectory of the movable object;
in response to determining that automatic tracking is available:
present a tracking annotation on the user interface device that is offset from the manual tracking annotation;
determine a confidence value of the tracking of the movable object;
present a confidence indicator on the user interface device to facilitate human collaboration with object tracking; and
switch from manual object tracking to automatic object tracking in response to a user input;
determine whether the confidence value is below a minimum confidence threshold; and
in response to determining that the confidence is below the minimum confidence threshold:
determine whether the confidence level is below the minimum confidence threshold based on one or more contributing factors from a group consisting of: (i) view change; (ii) illumination change; (iii) partial/full occlusion; (iv) lost track; and (v) failed image registration; and
present the one or more contributing factors via the user interface device to help the user develop a deeper understanding over time of the performance envelope of the object tracker under various viewing situations.

12. The system of claim 11, wherein the control station transmits a steering command to the airborne sensor to maintain the movable object within the full motion video based at least in part on the tracking of the movable object.

13. The system of claim 11, wherein the control station:
determines whether a visual discontinuity event of at least one: (i) relative orientation; and (ii) lighting of the movable object is occurring; and
in response to determining that the visual continuity event is occurring, presents an alert via the user interface device to enable a human to maintain familiarity with appearance of the movable object to expedite human collaboration.

14. The system of claim 11, wherein control station presents the confidence indicator via at least one of: (i) a selected color associated with a confidence level; and (ii) a numeric confidence value.

15. The system of claim 11, wherein the control station determines the confidence value by:
determining a current set of feature points of the movable object in a current portion of the full motion video;
determining a previous set of feature points of the movable object in a previous portion of the full motion video; comparing the current set and previous set of feature points; and
calculating the confidence value based on a relationship between matches between the current and previous sets.

16. The system of claim 11, wherein the control station determines and present the confidence value of the tracking of the movable object by:
determining whether a fault has occurred that presents automated tracking; and
in response to determining that the fault has occurred, presenting the confidence indicator comprising the fault occurrence on the user interface device to expedite human collaboration with object tracking.

17. A control station that enables efficient human collaboration with automated object tracking, the control station comprising:
a network interface communicatively coupled to an aerial vehicle having an airborne sensor; and
a controller communicatively coupled to the network interface and that enables the control station to:
receive full motion video of a ground scene taken by the airborne sensor;
spatially register features of a movable object present in the ground scene;
determine motion of the movable object relative to the ground scene;
predict a trajectory of the movable object relative to the ground scene; track the movable object based on data fusion of: (i) the spatially registered features; (ii) the determined motion; and (iii) the predicted trajectory of the movable object;
present a tracking annotation on a user interface device;
determine a confidence value of the tracking of the movable object;
present a current confidence indicator and at least one of historical and projected future confidence in performance on the user interface device to facilitate human collaboration with object tracking without over- and under-reliance on the object tracker;
determine whether the confidence value is below a minimum confidence threshold; and
in response to determining that the confidence is below the minimum confidence threshold:
determine whether the confidence level is below the minimum confidence threshold based on one or more contributing factors from a group consisting of: (i) view change; (ii) illumination change; (iii) partial/full occlusion; (iv) lost track; and (v) failed image registration; and
present the one or more contributing factors via the user interface device to help the user develop a deeper understanding over time of the performance envelope of the object tracker under various viewing situations.

18. The control station of claim 17, wherein the controller transmits a steering command to the airborne sensor to maintain the movable object within the full motion video based at least in part on the tracking of the movable object.

19. The control station of claim 18, wherein the controller:
determines whether a visual discontinuity event of at least one: (i) relative orientation; and (ii) lighting of the movable object is occurring for the movable object that remains within a field of view of the airborne sensor; and
in response to determining that the visual continuity event is occurring, presents an alert via the user interface device, the alert capable of being perceived by a user that is not paying attention to the ground scene to enable a human to maintain familiarity with appearance of the movable object to expedite human collaboration.

20. The control station of claim 17, wherein controller presents the confidence indicator via at least one of: (i) a selected color associated with a confidence level; and (ii) a numeric confidence value.

21. The control station of claim 17, wherein the controller determines the confidence value by:
  determining a current set of feature points of the movable object in a current portion of the full motion video;
  determining a previous set of feature points of the movable object in a previous portion of the full motion video; comparing the current set and previous set of feature points; and
  calculating the confidence value based on a relationship between matches between the current and previous sets.

22. The control station of claim 17, wherein the controller determines and presents the confidence value of the tracking of the movable object by:
  determining whether a fault has occurred that presents automated tracking; and
  in response to determining that the fault has occurred, presenting the confidence indicator comprising the fault occurrence on the user interface device to expedite human collaboration with object tracking.

* * * * *